(12) United States Patent
Krauss et al.

(10) Patent No.: US 10,564,915 B2
(45) Date of Patent: Feb. 18, 2020

(54) DISPLAYING CONTENT BASED ON POSITIONAL STATE

(71) Applicant: Microsoft Technology Licensing, LLC, Redmond, WA (US)

(72) Inventors: Aaron D. Krauss, Seattle, WA (US); Jamie R. Cabaccang, Bellevue, WA (US); Jennifer J. Choi, Seattle, WA (US); Michelle Tze Hiang Chua, Seattle, WA (US); Priya Ganadas, Seattle, WA (US); Donna Katherine Long, Redmond, WA (US); Kenneth Liam Kiemele, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 6 days.

(21) Appl. No.: 15/912,457

(22) Filed: Mar. 5, 2018

(65) Prior Publication Data

US 2019/0272138 A1    Sep. 5, 2019

(51) Int. Cl.
*G06F 3/14* (2006.01)
*G06T 19/00* (2011.01)
(Continued)

(52) U.S. Cl.
CPC ............ *G06F 3/1446* (2013.01); *G06F 3/012* (2013.01); *G06F 3/013* (2013.01); *G06F 3/1423* (2013.01); *G06F 3/1454* (2013.01); *G06T 19/006* (2013.01); *G09G 5/14* (2013.01); *G09G 5/38* (2013.01); *G09G 2320/0261* (2013.01);
(Continued)

(58) Field of Classification Search
None
See application file for complete search history.

(56) References Cited

U.S. PATENT DOCUMENTS 7,946,921 B2 *   5/2011   Ofek .................... A63F 13/06
                                                                 463/37
8,786,517 B2     7/2014   Lewin et al.
(Continued)

OTHER PUBLICATIONS

"Trackir 5", Retrieved From <<http://www.naturalpoint.com/trackir/trackir5/>>, Retrieved on: Jan. 3, 2018, 9 Pages.
(Continued)

*Primary Examiner* — Phong X Nguyen
(74) *Attorney, Agent, or Firm* — Alleman Hall Creasman & Tuttle LLP

(57) ABSTRACT

A computing system is provided, including a plurality of display devices including at least a first display device and a second display device. The computing system may further include one or more sensors configured to detect a first positional state of the first display device relative to the second display device and at least one user. The first positional state may include an angular orientation of the first display device relative to the second display device. The computing system may further include a processor configured to receive the first positional state from the one or more sensors. The processor may be further configured to generate first graphical content based at least in part on the first positional state. The processor may be further configured to transmit the first graphical content for display at the first display device.

19 Claims, 23 Drawing Sheets

(51) Int. Cl.
  *G06F 3/01* (2006.01)
  *G09G 5/14* (2006.01)
  *G09G 5/38* (2006.01)

(52) U.S. Cl.
  CPC . *G09G 2340/0464* (2013.01); *G09G 2354/00* (2013.01); *G09G 2356/00* (2013.01)

(56) References Cited

U.S. PATENT DOCUMENTS

| | | | |
|---|---|---|---|
| 8,823,640 | B1 | 9/2014 | Harris |
| 8,983,539 | B1 | 3/2015 | Kim et al. |
| 9,224,358 | B2 | 12/2015 | Drake et al. |
| 9,235,373 | B2 | 1/2016 | Toren et al. |
| 9,377,989 | B2 | 6/2016 | Li et al. |
| 9,483,997 | B2 | 11/2016 | Candelore |
| 2008/0303746 | A1 | 12/2008 | Schlottmann et al. |
| 2010/0225664 | A1 | 9/2010 | Ogasawara |
| 2010/0269072 | A1* | 10/2010 | Sakata ................ G06F 1/1601 715/863 |
| 2012/0081270 | A1 | 4/2012 | Gimpl et al. |
| 2012/0200600 | A1* | 8/2012 | Demaine ................ A63F 13/10 345/633 |
| 2013/0127838 | A1* | 5/2013 | Derrig ................ G06T 15/00 345/419 |
| 2013/0314406 | A1* | 11/2013 | Lin ................ G06T 15/20 345/419 |
| 2014/0002327 | A1* | 1/2014 | Toren ................ G06F 3/1423 345/1.1 |
| 2015/0116362 | A1 | 4/2015 | Aurongzeb et al. |
| 2015/0130725 | A1 | 5/2015 | Knepper et al. |
| 2015/0149956 | A1* | 5/2015 | Kempinski ............ G06F 3/017 715/784 |
| 2015/0186022 | A1* | 7/2015 | Conn ................ G06F 3/0346 715/765 |
| 2015/0234468 | A1 | 8/2015 | Hwang et al. |
| 2016/0283084 | A1 | 9/2016 | Keysers et al. |
| 2017/0090560 | A1* | 3/2017 | Chen ................ G06F 3/013 |
| 2019/0012129 | A1* | 1/2019 | Han ................ G06F 3/1446 |

OTHER PUBLICATIONS

Labarre, Suzanne, "It Exists! MIT Creates Tech for Moving Files Across Devices With a Swipe", Retrieved From <<https://www.fastcodesign.com/1669697/it-exists-mit-creates-tech-for-moving-files-across-devices-with-a-swipe>>, May 7, 2012, 18 Pages.

"International Search Report and Written Opinion Issued in PCT Application No. PCT/US19/018855", dated May 22, 2019, 15 Pages.

* cited by examiner

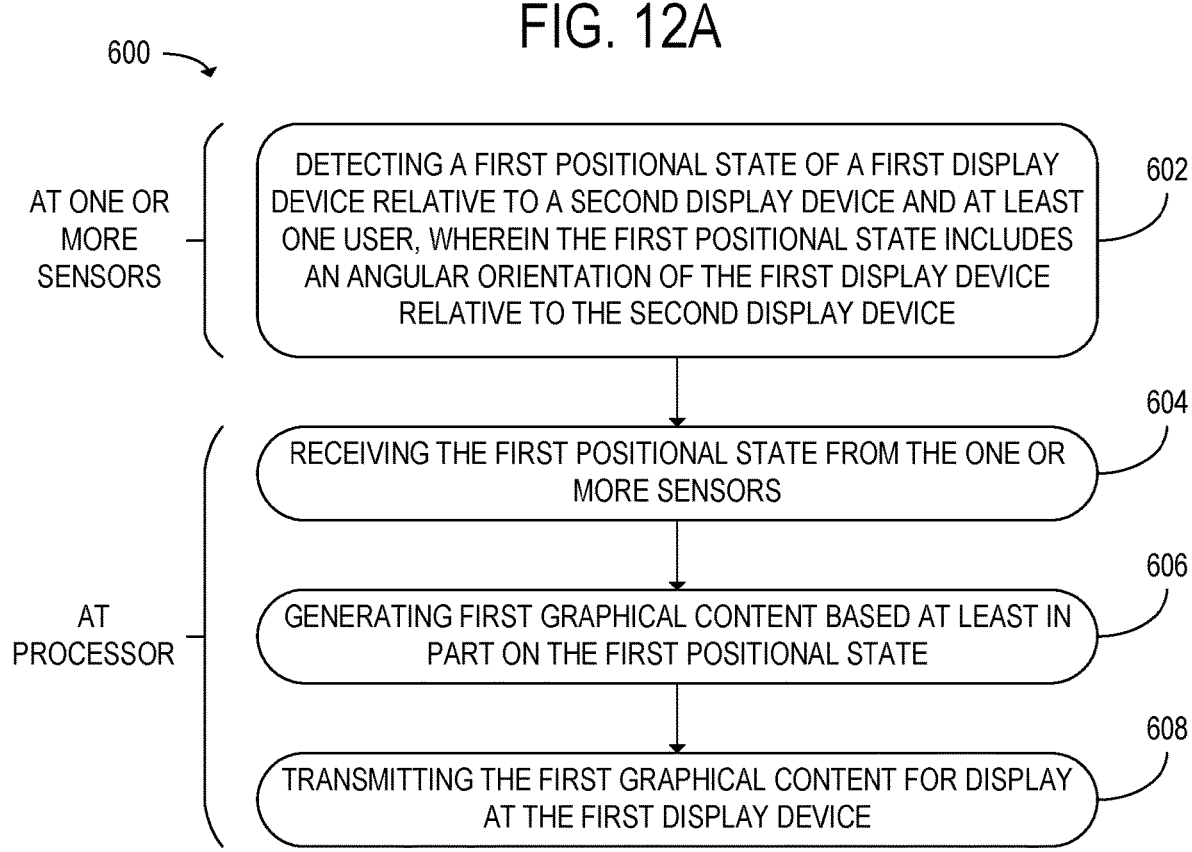

DISPLAYING CONTENT BASED ON POSITIONAL STATE

BACKGROUND

Existing methods of displaying a three-dimensional virtual object typically include depicting the object from the perspective of a virtual camera. Such methods typically assume that only one user is viewing the object, or that, if multiple viewers are viewing the object, differences in perspective between the users are negligible. As a result of this assumption, multiple users may sometimes have to crowd around a single display to view a three-dimensional virtual object.

SUMMARY

According to one aspect of the present disclosure, a computing system is provided, comprising a plurality of display devices including at least a first display device and a second display device. The computing system may further comprise one or more sensors configured to detect a first positional state of the first display device relative to the second display device and at least one user. The first positional state may include an angular orientation of the first display device relative to the second display device. The computing system may further comprise a processor configured to receive the first positional state from the one or more sensors. The processor may be further configured to generate first graphical content based at least in part on the first positional state. The processor may be further configured to transmit the first graphical content for display at the first display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 12A shows a flowchart of a method for displaying graphical content, according to one embodiment of the present disclosure.

DETAILED DESCRIPTION

Figure 1:
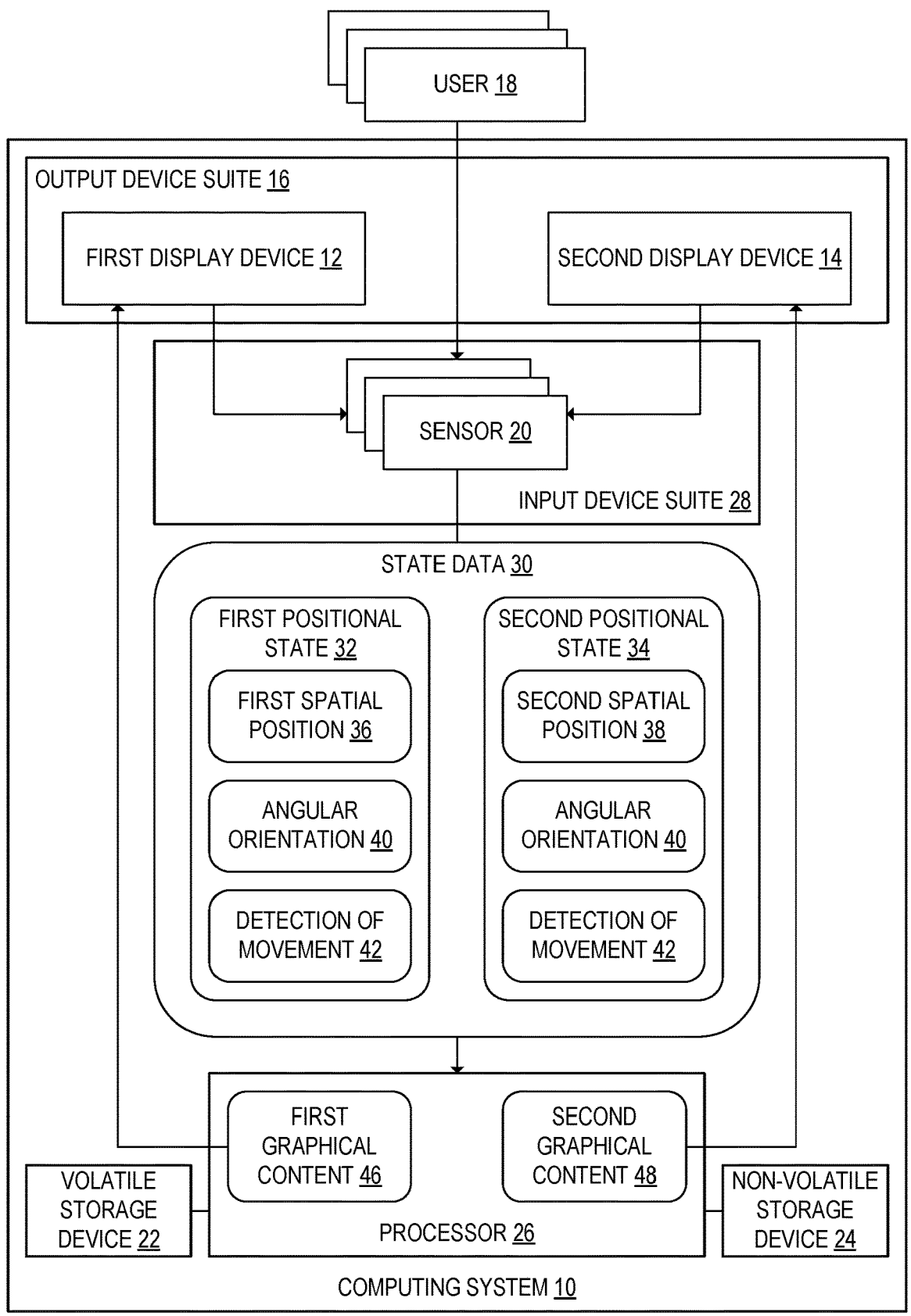
FIG. 1 shows an example computing system, according to one embodiment of the present disclosure.

In order to address the shortcomings of existing methods of displaying three-dimensional virtual objects, the inventors have developed a computing system for displaying content based on positional state data. FIG. 1 schematically depicts an example computing system 10 according to one embodiment of the present disclosure. The computing system 10 may be embodied as a single device or may be distributed across a plurality of devices. As shown in FIG. 1, the computing system 10 includes an output device suite 16 that includes a plurality of display devices and may further include other types of output devices such as one or more speakers and/or one or more haptic feedback units. The plurality of display devices include at least a first display device 12 and a second display device 14. For example, each of the first display device 12 and the second display device 14 may be a smartphone, a tablet, a smartboard, a monitor, a smartwatch, a head-mounted display device, or some other type of display device. In some embodiments, the output device suite 16 may include more than two display devices. In examples provided herein where the computing system 10 includes two display devices, it is understood that more than two display devices may alternatively be used.

The computing system 10 as shown in FIG. 1 further includes an input device suite 28 which includes one or more sensors 20. For example, the one or more sensors 20 may include one or more of a depth camera, an RGB camera, an inertial measurement unit, and a wireless receiver. It will be appreciated that an inertial measurement unit may include accelerometers, gyroscopes, and/or magnetometers, and may be configured to measure a specific force, angular rate and magnetic field experienced by the inertial measurement unit. A typical six degree of freedom IMU may be used that includes a three degree of freedom accelerometer and three degree of freedom gyroscope. The output of these sensors may be fed to a motion estimation algorithm implemented by the processor 26 to compute positional states of the display devices. The depth camera and RGB camera may be used in combination to perform simultaneous localization and mapping algorithm, which simultaneously maps the environment (i.e., room) in which the device is being used, and localizes the position of the device within a frame of reference in the room. The frame of reference may be established by optically distinguishable characteristics in the room, recognized surfaces in the room, etc. Alternatively or in addition, for applications in which GPS signals are available, such as outdoors, a GPS sensor may be included and absolute geographic coordinates may be computed from received satellite signals. In this way, an x, y, and z position and a pitch, roll and yaw angular orientation may be determined for each display device. Regarding the input device suite 28, this suite may include user input devices such as one or more of a touchscreen, a mouse, a trackpad, a button, a keyboard, and/or a microphone.

The one or more sensors 20 are configured to detect state data 30 pertaining to at least the first display device 12. The state data 30 includes a first positional state 32 of the first display device 12 relative to the second display device 14 and at least one user 18. The first positional state 32 may include, for example, a first spatial position 36 of the first display device 12 relative to at least the second display device 14 and the at least one user 18. The positional state 32 may further include an angular orientation 40 of the first display device 12 relative to the second display device 14. The angular orientation 40 may be an angle between a plane of a screen of the first display device 12 and a plane of a screen of the second display device 14, for example, or may be calculated in another manner. In embodiments in which the computing system 10 includes more than two display devices, the first positional state 32 may include an angular orientation of the first display device 12 relative to each of the other display devices.

In some embodiments, the one or more sensors 20 may be further configured to detect a second positional state 34 of the second display device 14 relative to the first display device 12 and the at least one user 18. The second positional state 34 may be included in the state data 30 and may include a second spatial position 38 of the second display device 14. The second positional state 34 may further include the angular orientation 40 of the first display device 12 relative to the second display device 14. In embodiments in which the computing system 10 includes more than two display devices, the second positional state 34 may include an angular orientation of the second display device 14 relative to each of the other display devices.

In some embodiments, the one or more sensors 20 may be further configured to detect a movement of at least one of the first display device 12, the second display device 14, and the at least one user 18. In embodiments in which the computing system 10 includes more than two display devices, the one or more sensors 20 may be further configured to detect movement of the additional display devices. The detection of movement 42 may be included in the first positional state 32 and/or the second positional state 34.

The computing system 10 depicted in FIG. 1 further includes a volatile storage device 22, a non-volatile storage device 24, and a processor 26. The processor 26 is configured to receive the state data 30 including the first positional state 32 from the one or more sensors 20. In embodiments in which the state data 30 includes the second positional state 34 of the second display device 14, the processor 26 may be further configured to receive the second positional state 34 from the one or more sensors 20.

The processor 26 is further configured to generate first graphical content 46 based at least in part on the first positional state 32. The graphical content 46 may also be generated based at least in part on other data stored in the volatile storage device 22 and/or the non-volatile storage device 24, such as one or more application programs. The processor 26 may then transmit the first graphical content 46 for display at the first display device 12. The first graphical content 46 may be transmitted to the first display device 12 via a wired or wireless connection. In embodiments in which the state data 30 includes the second positional state 34, the processor 26 may be further configured to generate second graphical content 48 based at least in part on the second positional state 34. The processor 26 may be further configured to transmit the second graphical content 48 for display at the second display device 14. In some embodiments, the first graphical content 46 and/or the second graphical content 48 may be generated based at least in part on both the first positional state 32 and the second positional state 34.

Figure 2:
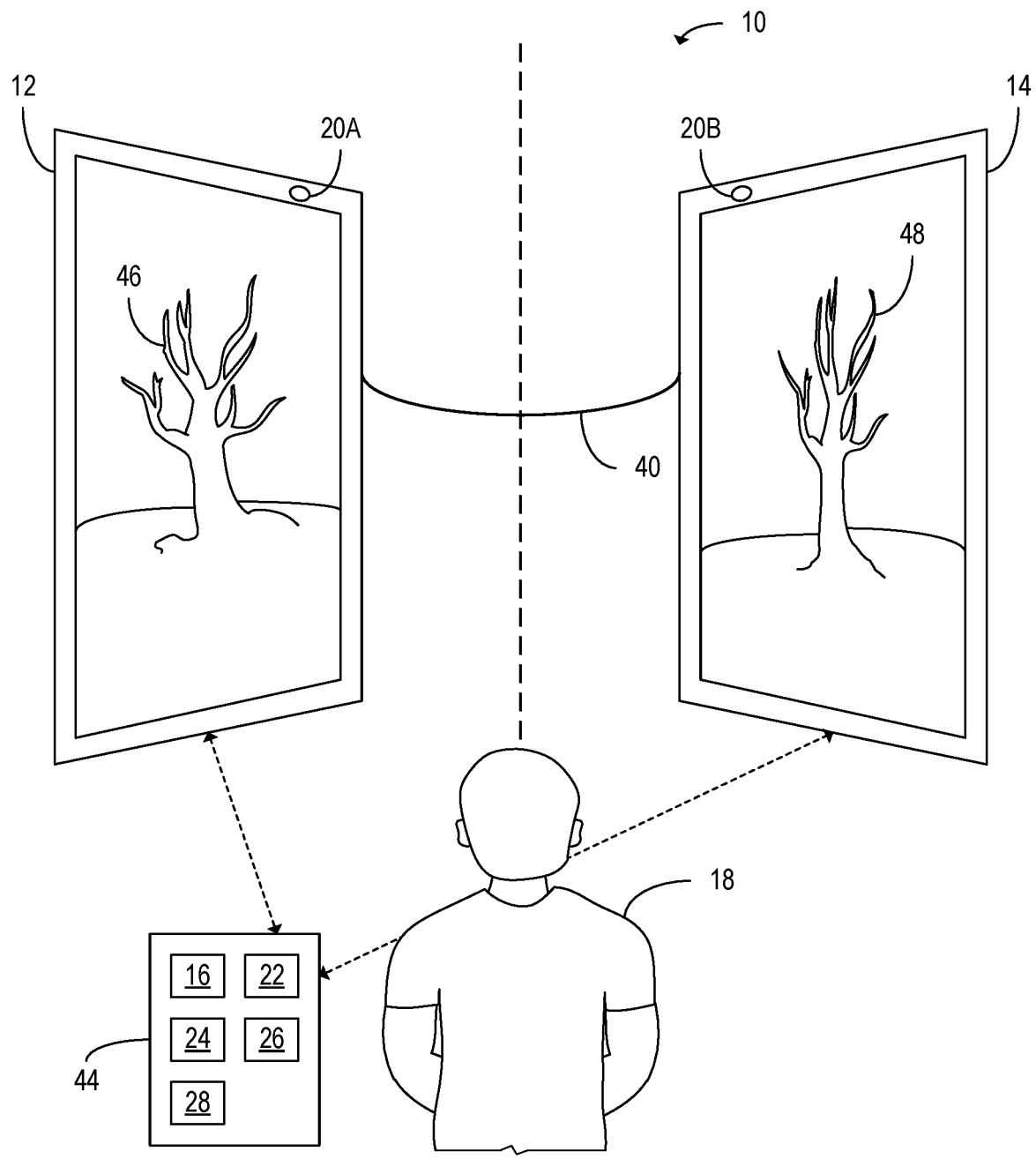
FIG. 2 shows an example computing system including a first display device and a second display device, according to the embodiment of FIG. 1.

FIG. 2 shows an example of the computing system 10. In the example of FIG. 2, the first display device 12 and the second display device 14 respectively include sensors 20A and 20B of the one or more sensors 20. The sensors 20A and 20B may each be, for example, depth cameras or RGB cameras configured to detect the positions and/or angular orientations of the at least one user 18 and the other display device. The first display device 12 and the second display device 14 may communicate with a console 44. The console 44 may include, in the input device suite 28 and the output device suite 16, one or more input devices and/or output devices that are not included in the first display device 12 or the second display device 14. Although, in FIG. 2, the one or more sensors 20 are depicted as sensors 20A and 20B included in the first display device 12 and the second display device 14, the one or more sensors 20 configured to detect at least the first positional state 32 may additionally or alternatively be included in the console 44. The console 44 may further include any of the volatile storage device 22, the non-volatile storage device 24, and the processor 26.

The console 44 may be embodied as a single device or as a plurality of connected devices. In some embodiments, the console 44 may be fully or partially embodied in at least one of the first display device 12 and the second display device 14. In one example, each of the first display device 12 and the second display device 14 may include each of the components of the console 44 shown in FIG. 2. Each of the console 44, the first display device 12, and/or the second display device 14 may include a communication subsystem, described in further detail below with reference to FIG. 13. The communication subsystem(s) of each of the console 44, the first display device 12, and/or the second display device 14 may each include a transmitter and/or a receiver, which may allow the state data 30, first graphical content 46, second graphical content 48, and/or other information to be sent and received by the devices included in the computing system 10. In this way, the first and second display devices 12, 14 may share the computation burden for computing the relative positions between the displays and viewing users described herein, and may exchange such information via peer-to-peer connections such that each display device maintains a current copy of the relative positional data for all display devices and detected users.

As shown in FIG. 2, the first display device 12 is positioned at an angular orientation 40 relative to the second display device 14. In the embodiment of FIG. 2, each of the first display device 12 and the second display device 14 has a substantially planar surface, and the angular orientation 40 is an angle between the planar surface of the first display device 12 and the planar surface of the second display device 14.

Figure 3A:
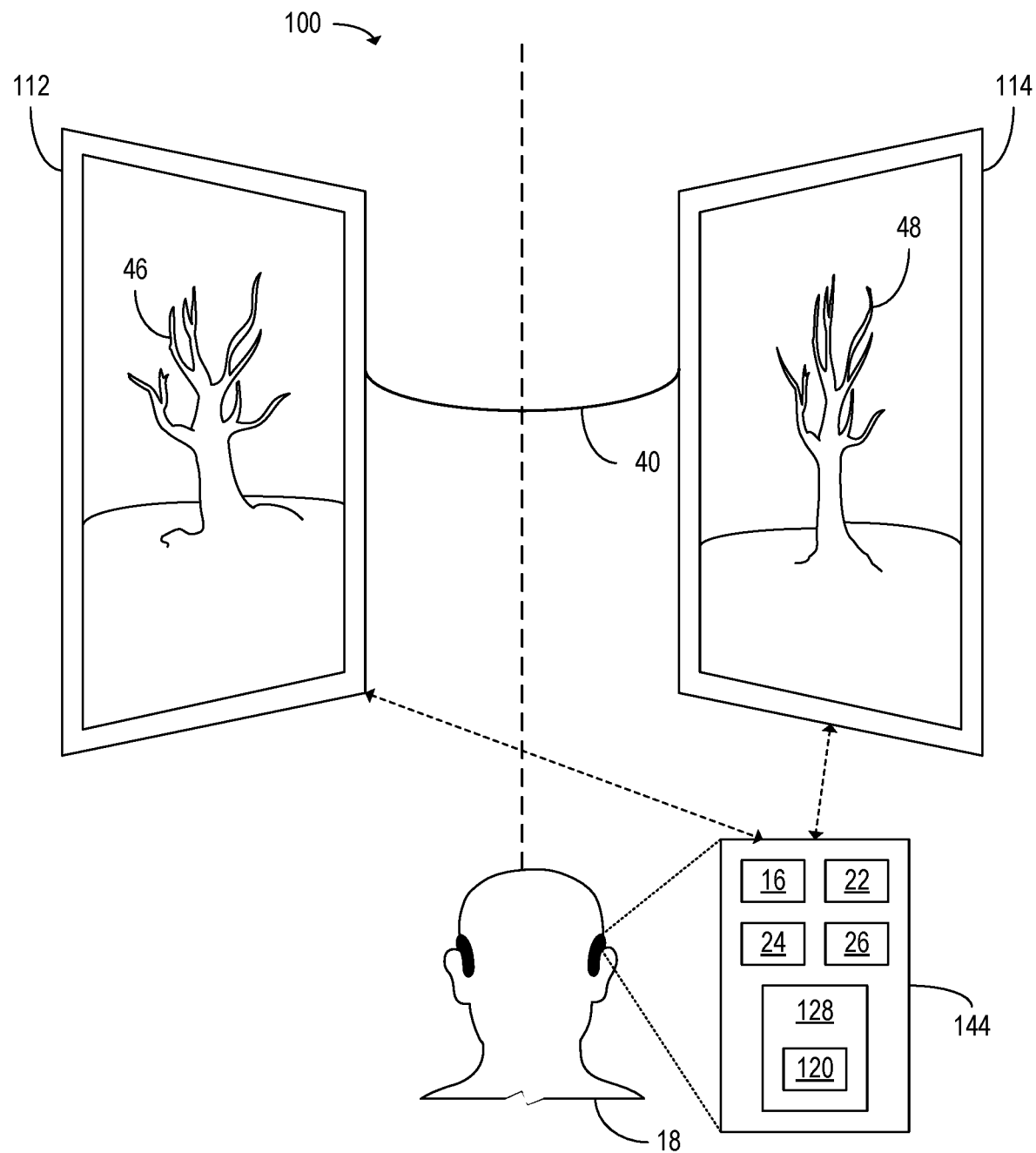
FIG. 3A shows an example computing system including a first display device, a second display device, and a head-mounted display device, according to one embodiment of the present disclosure.
Figure 3B:
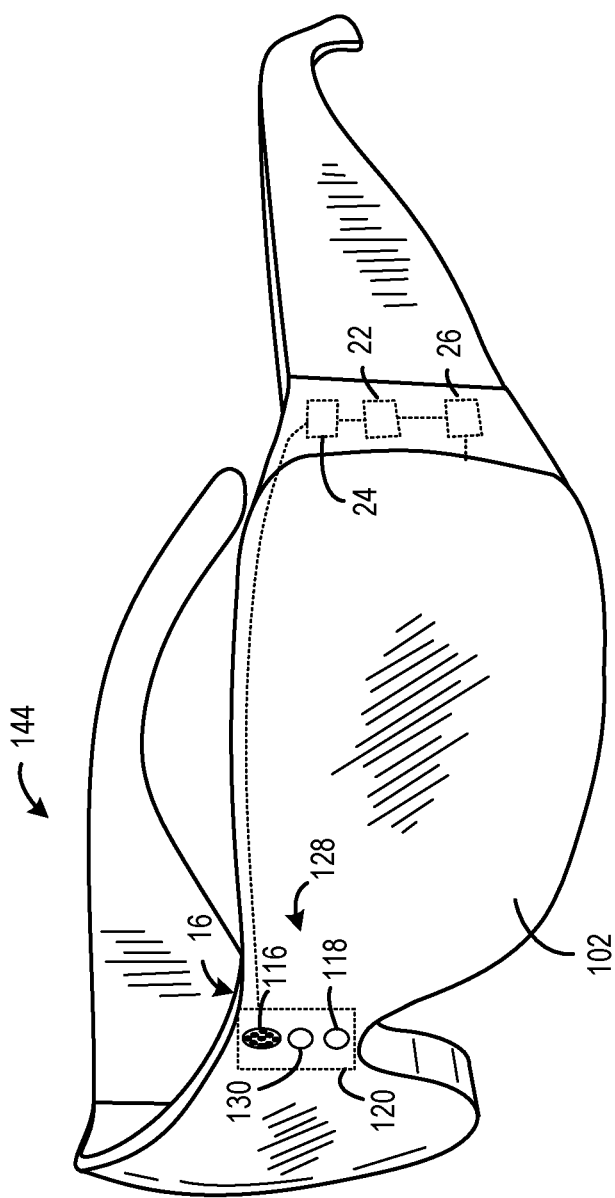
FIG. 3B shows an example head-mounted display device, according to the embodiment of FIG. 3A.

FIGS. 3A-B shows another example computing system 100. In the embodiment of FIG. 3A, the computing system 100 includes a head-mounted display device 144. The first display device 112 and the second display device 114 shown in FIG. 3A do not include the one or more sensors 120 that are configured to detect the positional state. Instead, the one or more sensors 120 are instead included in an input device suite 128 of the head-mounted display device 144. The one or more sensors 120 may be configured to detect the first and second positional states 32 and 34. The output device suite 16 of the head-mounted display device 144 may include one or more output devices other than the first display device 112 and the second display device 114. The head-mounted display device 144 may further include any of a volatile storage device 22, a non-volatile storage device 24, and a processor 26. In some embodiments, the volatile storage device 22, the non-volatile storage device 24, and/or the processor 26 may be wholly or partially included in one or more offboard computing devices communicatively coupled to the head-mounted display device 144.

FIG. 3B illustrates an example head-mounted display device 144. The illustrated head-mounted display device 144 takes the form of wearable glasses or goggles, but it will be appreciated that other forms are possible. The head-mounted display device 144 may include a display 102 in the output device suite 16. In some embodiments, the head-mounted display device 144 may be configured in an augmented reality configuration to present an augmented reality environment, and thus the display 102 may be an at least partially see-through stereoscopic display configured to visually augment an appearance of a physical environment being viewed by the user through the display. In some examples, the display 102 may include one or more regions that are transparent (e.g. optically clear) and may include one or more regions that are opaque or semi-transparent. In other examples, the display 102 may be transparent (e.g. optically clear) across an entire usable display surface of the display 102. Alternatively, the head-mounted display device 144 may be configured in a virtual reality configuration to present a full virtual reality environment, and thus the display 102 may be a non-see-though stereoscopic display. The head-mounted display device 144 may be configured to display virtual three-dimensional environments to the user via the non-see-through stereoscopic display. The head-mounted display device 144 may be configured to display a virtual representation such as a three-dimensional graphical rendering of the physical environment in front of the user 18 that may include additional virtual objects.

For example, the output device suite 16 of the head-mounted display device 144 may include an image production system that is configured to display virtual objects to the user with the display 102. In the augmented reality configuration with an at least partially see-through display, the virtual objects are visually superimposed onto the physical environment that is visible through the display 102 so as to be perceived at various depths and locations. In the virtual reality configuration, the image production system may be configured to display virtual objects to the user with the non-see-through stereoscopic display, such that the virtual objects are perceived to be at various depths and locations relative to one another. In one embodiment, the head-mounted display device 144 may use stereoscopy to visually place a virtual object at a desired depth by displaying separate images of the virtual object to both of the user's eyes. Using this stereoscopy technique, the head-mounted display device 144 may control the displayed images of the virtual objects, such that the user 18 will perceive that the virtual objects exist at a desired depth and location in the viewed physical environment.

The head-mounted display device 144 may include, in the input device suite 128, one or more input devices with which the user 18 may input information. The user input devices may include one or more optical sensors and one or more position sensors, which are discussed in further detail below. Additionally or alternatively, the user input devices may include one or more buttons, control sticks, microphones, touch-sensitive input devices, or other types of input devices.

The input device suite 128 of the head-mounted display device 144 may include one or more optical sensors. In one example, the input device suite 128 includes an outward-facing optical sensor 116 that may be configured to detect the real-world background from a similar vantage point (e.g., line of sight) as observed by the user through the display 102 in an augmented reality configuration. The input device suite 128 may additionally include an inward-facing optical sensor 118 that may be configured to detect a gaze direction of the user's eye. It will be appreciated that the outward facing optical sensor 116 may include one or more component sensors, including an RGB camera and a depth camera. The RGB camera may be a high definition camera or have another resolution. The depth camera may be configured to project non-visible light and capture reflections of the projected light, and based thereon, generate an image comprised of measured depth data for each pixel in the image. This depth data may be combined with color information from the image captured by the RGB camera, into a single image representation including both color data and depth data, if desired.

The head-mounted display device 144 may further include a position sensor system 130 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensors and/or position sensor information received from position sensors may be used to assess a position and orientation of the vantage point of head-mounted display device 144 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined with an on-board computing system and/or an off-board computing system, which may the processor 26, the volatile storage device 22, and/or the non-volatile storage device 24.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world. Additionally, the optical sensor information received from the one or more optical sensors may be used to identify and track objects in the field of view of the one or more optical sensors.

Figure 4A:
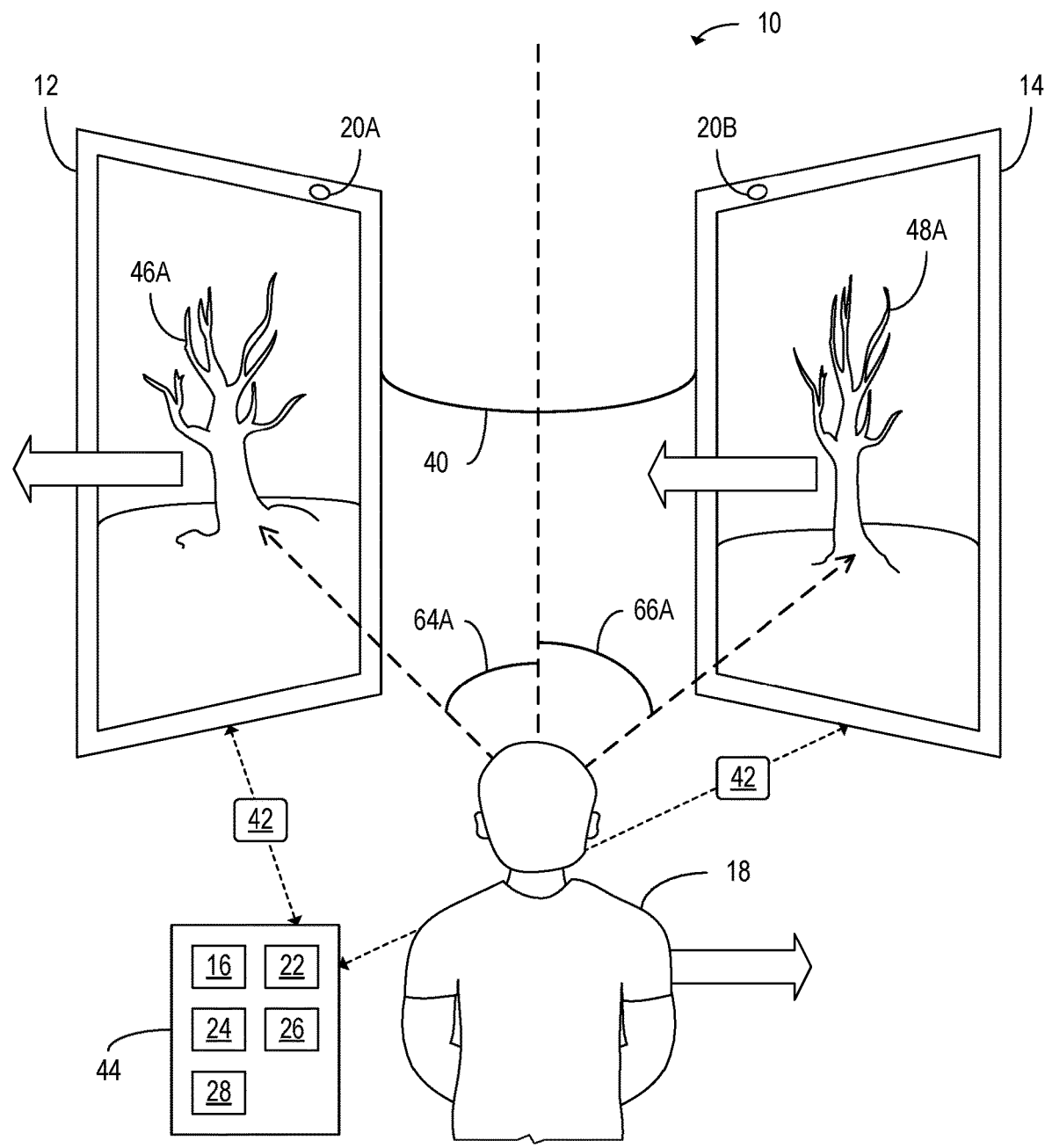
FIGS. 4A-4B show an example computing system configured to detect movement of a user, according to the embodiment of FIG. 1.

Returning to the embodiment of FIG. 2, the one or more sensors 20A and 20B may be further configured to detect a movement of at least one of the first display device 12, the second display device 14, and the at least one user 18. FIG. 4A shows an example in which the user 18 moves to the right. After the one or more sensors 20A and 20B detect the movement, the processor 26 may be further configured to receive the detection of the movement 42 from the one or more sensors 20A and 20B. The detection of the movement 42 may be transmitted to the processor 26 via a wired or wireless connection.

Figure 4B:
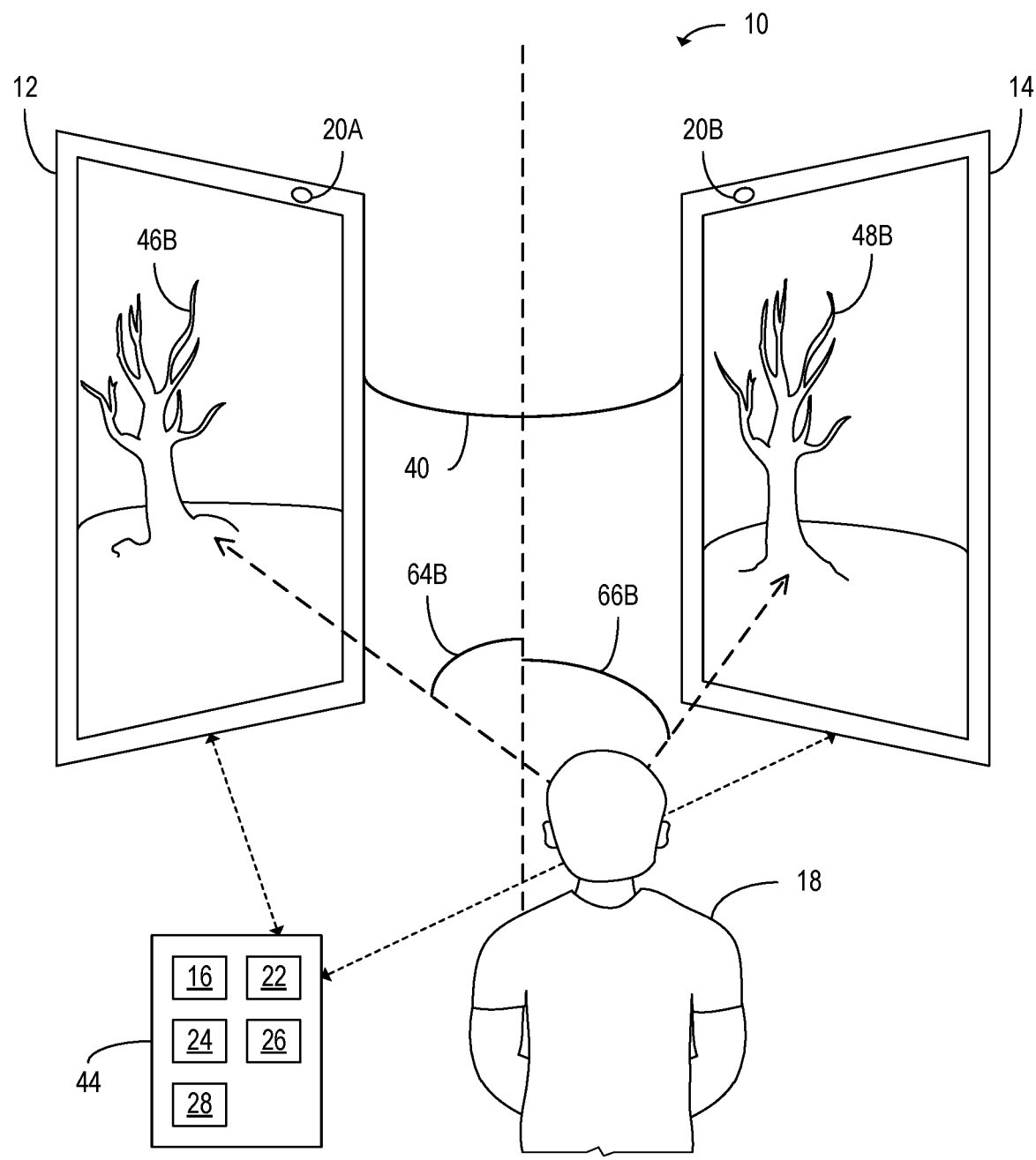

As shown in FIG. 4A, first graphical content 46A is displayed on the first display device 12 and second graphical content 48A is displayed on the second display device 14. After receiving the detection of movement 42, the processor 26 may be further configured to modify the first graphical content 46A based at least in part on the movement. Additionally or alternatively, the processor 26 may modify the second graphical content 48A based on the movement. FIG. 4B shows the first modified graphical content 46B and second modified graphical content 48B that are displayed after the user 18 has moved to the right.

Modifying the first graphical content 46A and/or the second graphical content 48A may include translating at least one graphical content item displayed on the first display device 12 and/or the second display device 14. In the example of FIGS. 4A-B, the first graphical content 46A and second graphical content 48A are modified by translating an image of a tree, shown on both the first display device 12 and the second display device 14, to the left.

In addition, the first graphical content 46A and/or the second graphical content 48A may include a three-dimensional virtual object. In FIGS. 4A-B, the tree is a three-dimensional virtual object. As shown in FIG. 4A, the user 18 views the tree on the first display device 12 at a first viewing angle 64A and on the second display device 14 at a second viewing angle 66A. Modifying the first graphical content 46A and/or the second graphical content 48A may include changing the viewing angle at which the three-dimensional virtual object is shown in the first graphical content 46A and/or the second graphical content 48A. In FIG. 4B, the user 18 views the tree on the first display device 12 at a modified first viewing angle 64B and on the second display device 14 at a modified second viewing angle 66B.

Figure 5A:
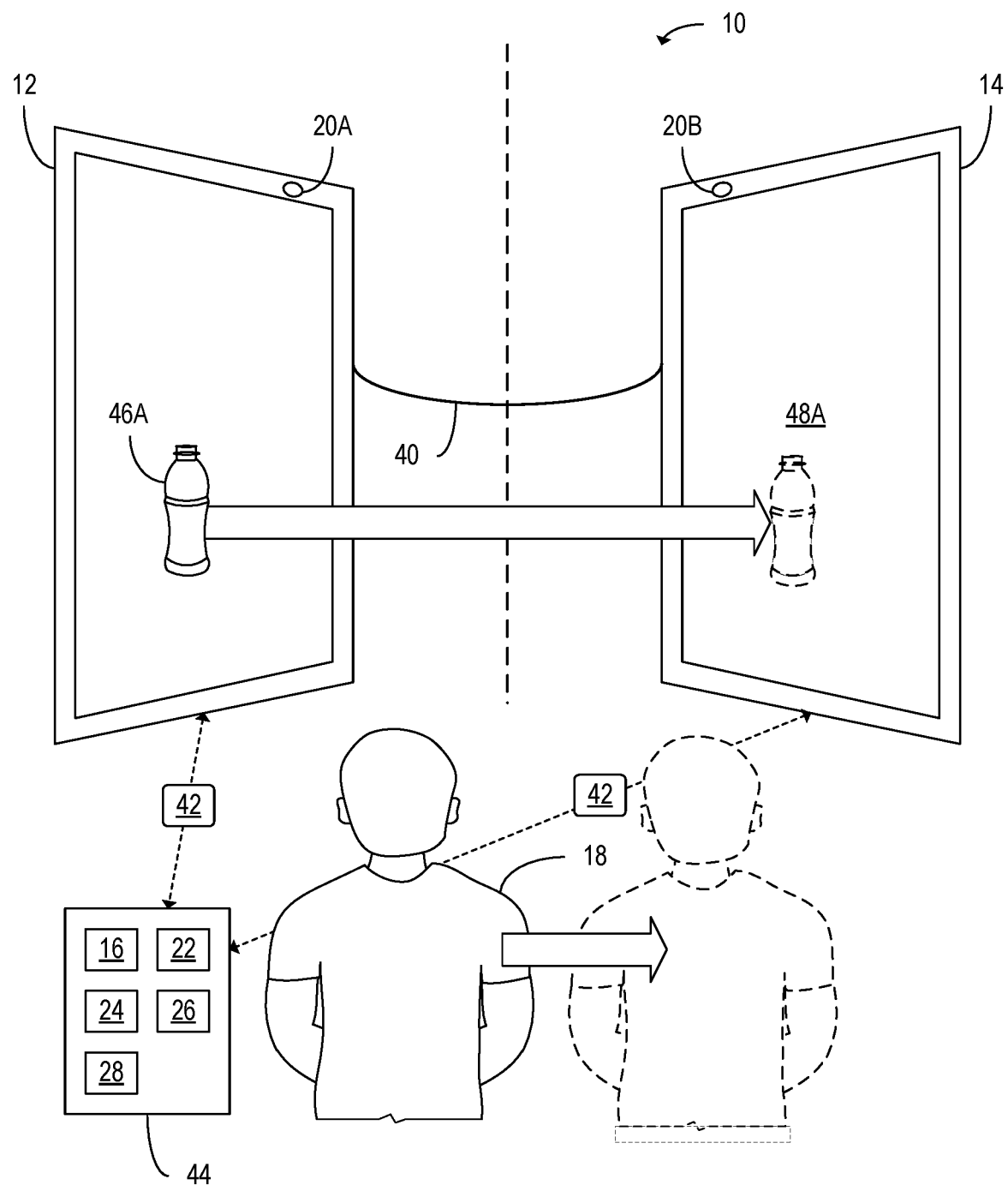
FIGS. 5A-5B show another example computing system configured to detect movement of a user, according to the embodiment of FIG. 1.
Figure 5B:
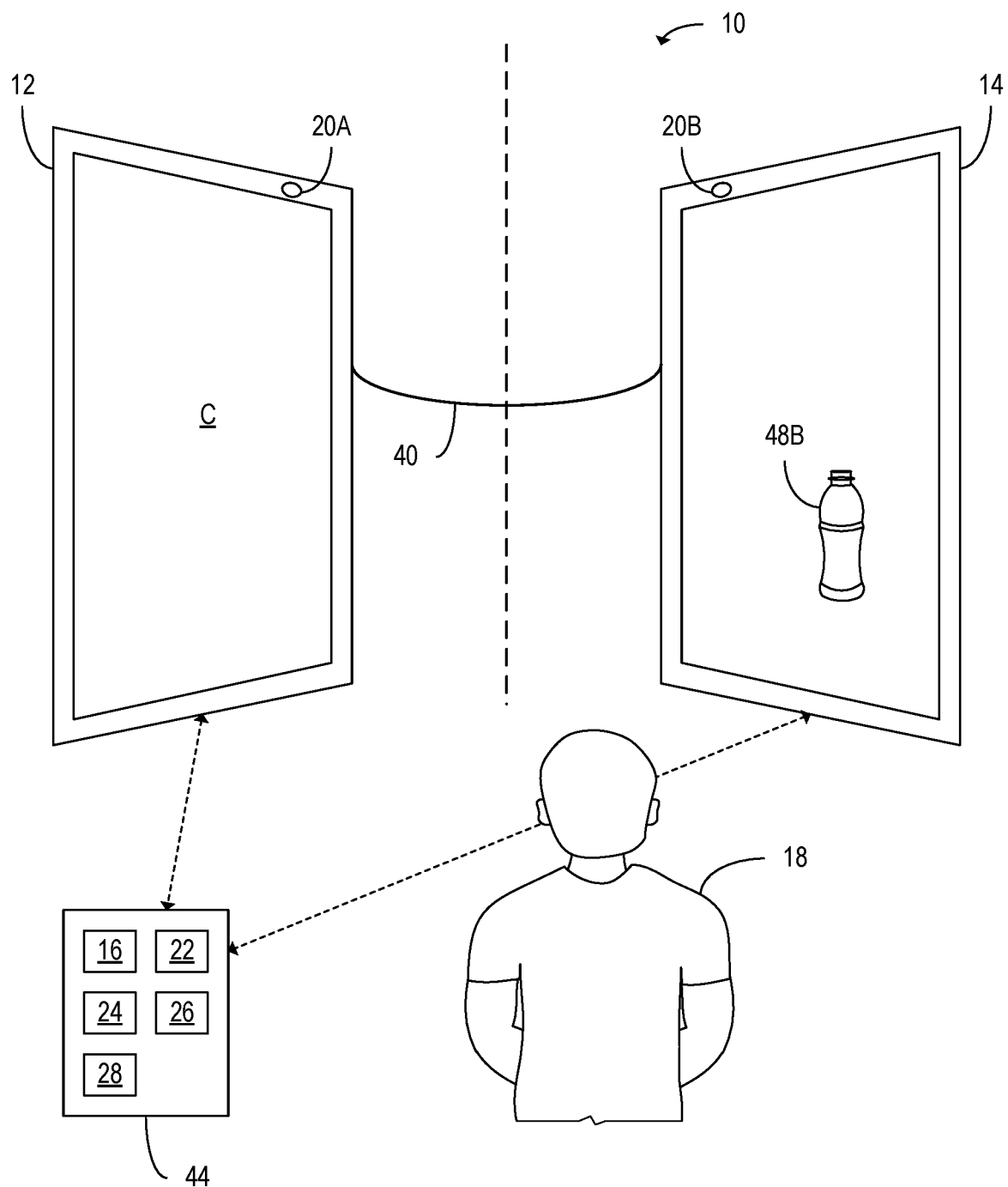

FIGS. 5A-B depict another example embodiment in which the one or more sensors 20A and 20B are further configured to detect a movement of at least one of the first display device 12, the second display device 14, and the at least one user 18. As shown in FIG. 5A, the one or more sensors 20A and 20B detect that the user 18 is moving to the right. Although the sensors 20A and 20B are included in the first display device 12 and the second display device 14 in FIGS. 5A-B, the sensors may alternatively be included in a head-mounted display device 144, as in FIG. 3, or in a console 44, as in FIG. 2. First graphical content 46A is displayed at the first display device 12. In addition, second graphical content 48A may be displayed at the second display device 14. In the example embodiment of FIG. 5A, the second graphical content 48A includes no graphical content items.

FIG. 5B shows the computing system 10 of FIG. 5A after the user 18 has moved to the right. As shown in FIG. 5A, the processor 26 receives a detection of the movement 42 of the user 18 from the one or more sensors 20A and 20B. In response to the detection, the processor 26 modifies the first graphical content 46A to remove a graphical content item (a bottle), thereby generating first modified graphical content 46B. The processor 26 then generates second modified graphical content 48B, including the graphical content item that was removed from the first graphical content 46A, and transmits the second modified graphical content 48B for display on the second display device 14, as shown in FIG. 5B. The processor 26 also transmits the first modified graphical content 46B to the first display device 12. The graphical content item is thereby transferred from the first display device 12 to the second display device 14 in response to movement of the user 18.

Figure 6A:
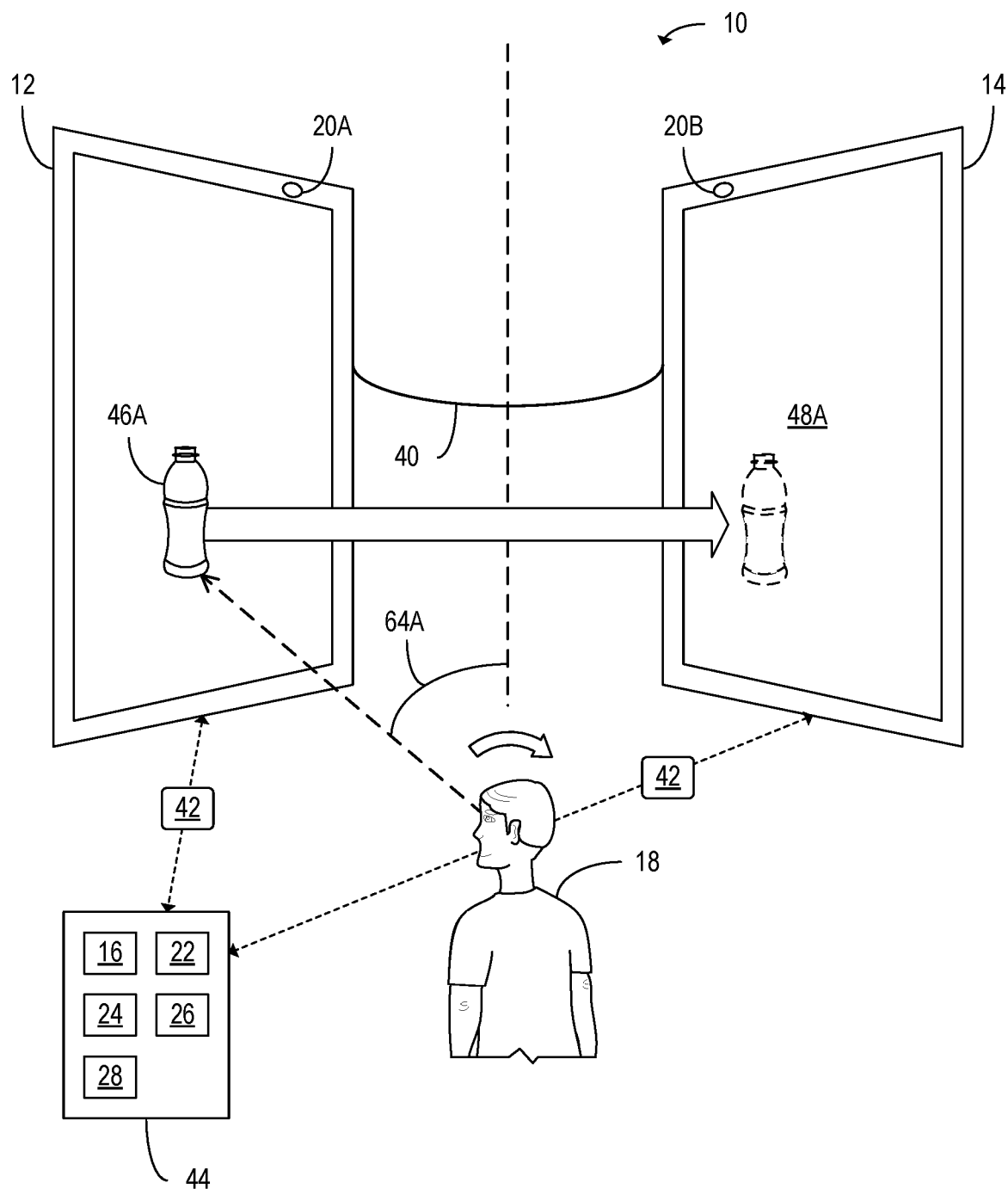
FIGS. 6A-B show an example computing system configured to detect a change in a user's head orientation and/or gaze direction, according to the embodiment of FIG. 1.
Figure 6B:
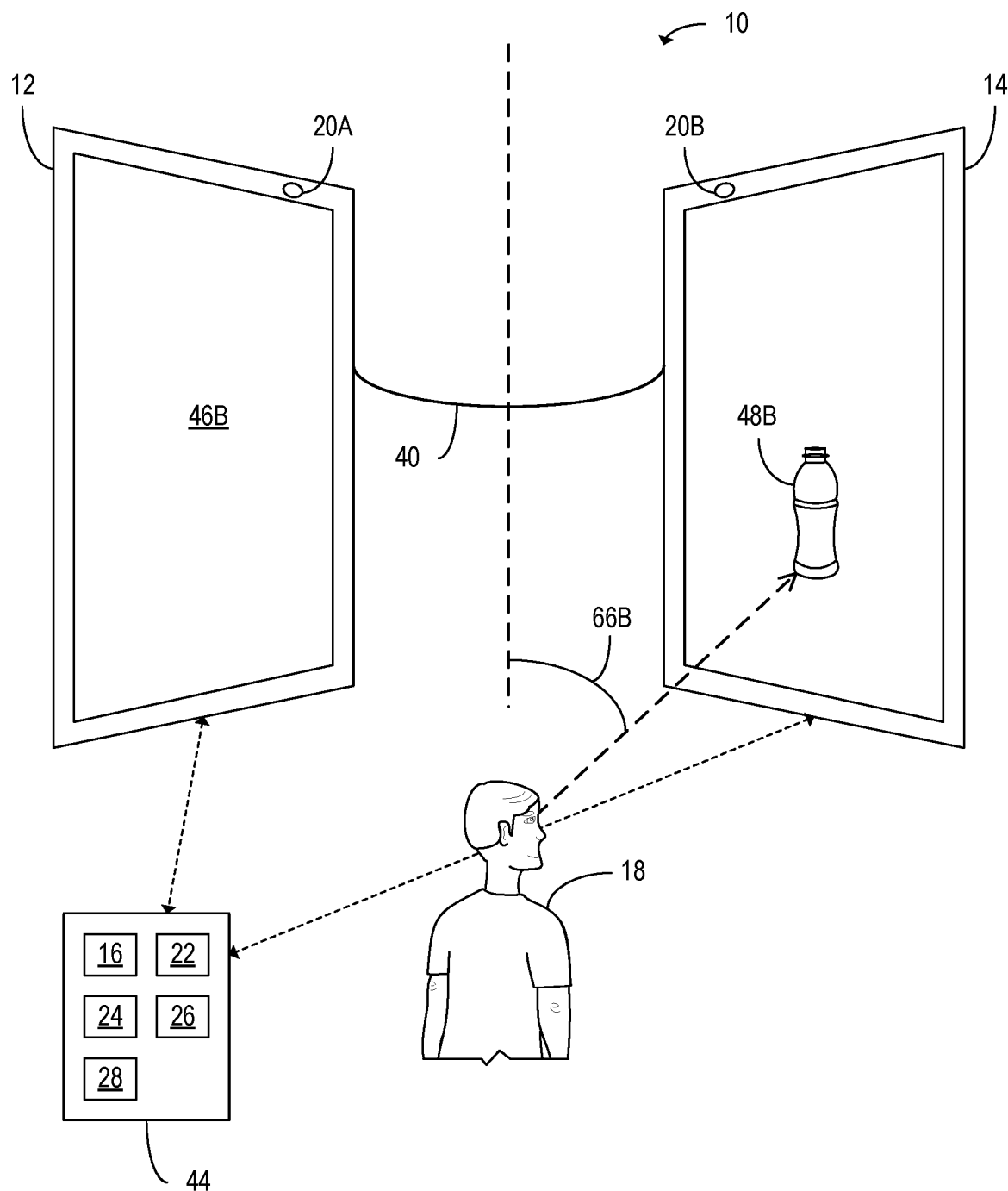

In some embodiments, the processor 26 may be further configured to determine at least one of a head orientation and/or gaze direction of the at least one user 18 relative to the first display device 12. An example of such an embodiment is shown in FIGS. 6A-B. As shown in FIG. 6A, the head orientation and/or gaze direction of the at least one user 18 relative to the first display device 12 may be a first viewing angle 64A at which a three-dimensional virtual object is shown in the first graphical content 46A displayed at the first display device 12. In other embodiments, the head orientation and/or gaze direction may include an angle at which the user 18 views a two-dimensional virtual object. Additionally or alternatively, the three-dimensional virtual object may be displayed at the second display device 14, as shown in FIGS. 4A-B. In such embodiments, the head orientation and/or gaze direction of the at least one user 18 may be a second viewing angle 66A at which the three-dimensional virtual object is shown at the second display device 14.

As shown in FIG. 6A, the processor 26 may be further configured to receive, from the sensors 20A and 20B, a detection of movement 42 that includes a change in the head orientation and/or gaze direction of the at least one user 18. The processor 26 may be further configured to detect a change in at least one of the head orientation and/or gaze direction based on the detection of movement 42. The processor 26 may then modify the first graphical content 46A and/or the second graphical content 48A based at least in part on the change, thereby generating first modified graphical content 46B and second modified graphical content 48B as shown in FIG. 6B. As in the example embodiment of FIGS. 5A-B, the graphical content item displayed in the first graphical content 46A in FIG. 6A is removed from the first graphical content 46A in response to the detection of movement 42. The graphical content item is instead included in the second modified graphical content 48B. The graphical content item may be viewed by the user 18 at a second modified viewing angle 66B. The processor 26 may thereby relocate the graphical content item to track the user's head orientation and/or gaze, even when relocating the graphical content item includes transferring it from the first display device 12 to the second display device 14.

Figure 7A:
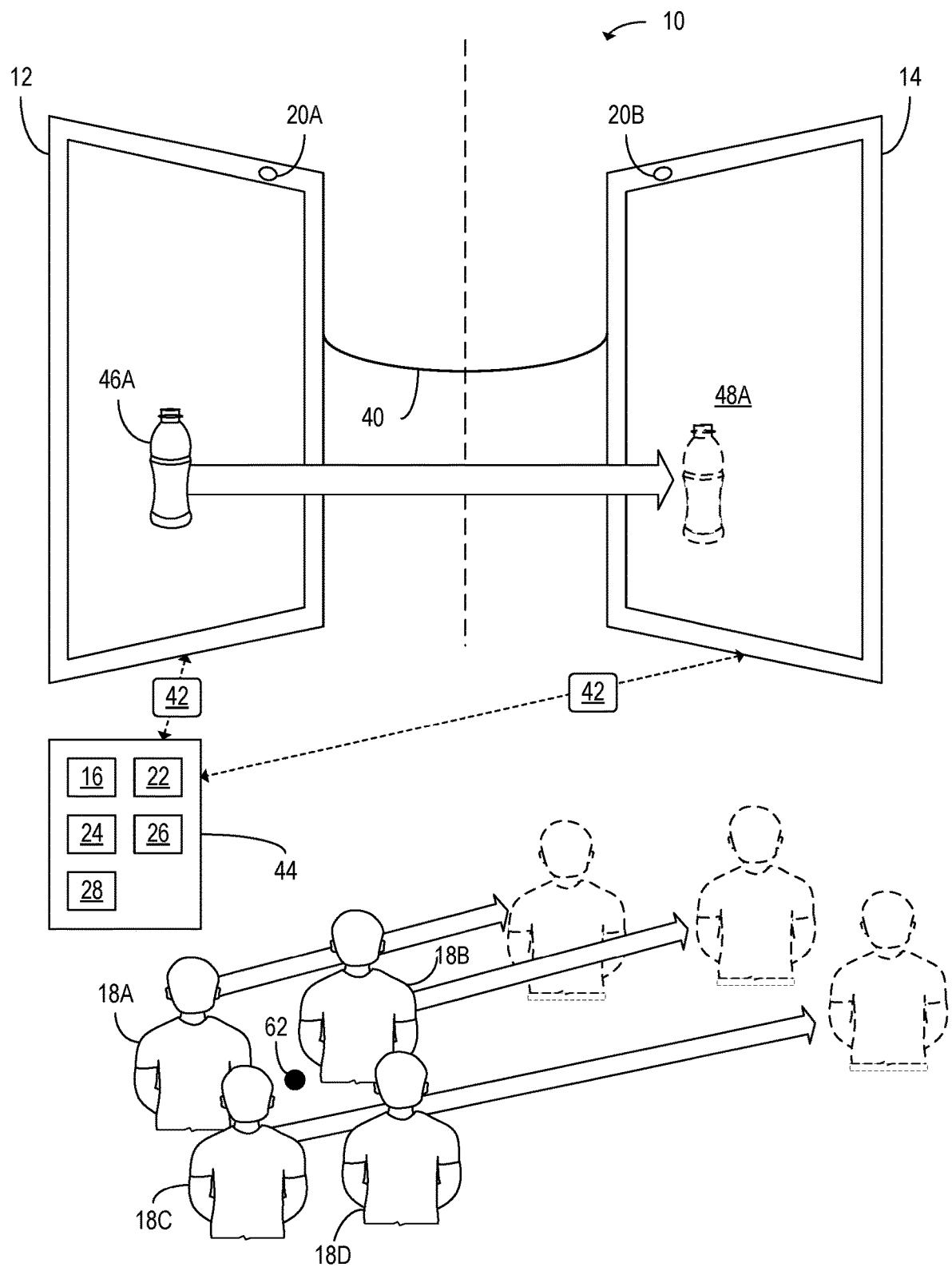
FIGS. 7A-7B show an example computing system configured to detect movement of a plurality of users, according to the embodiment of FIG. 1.
Figure 7B:
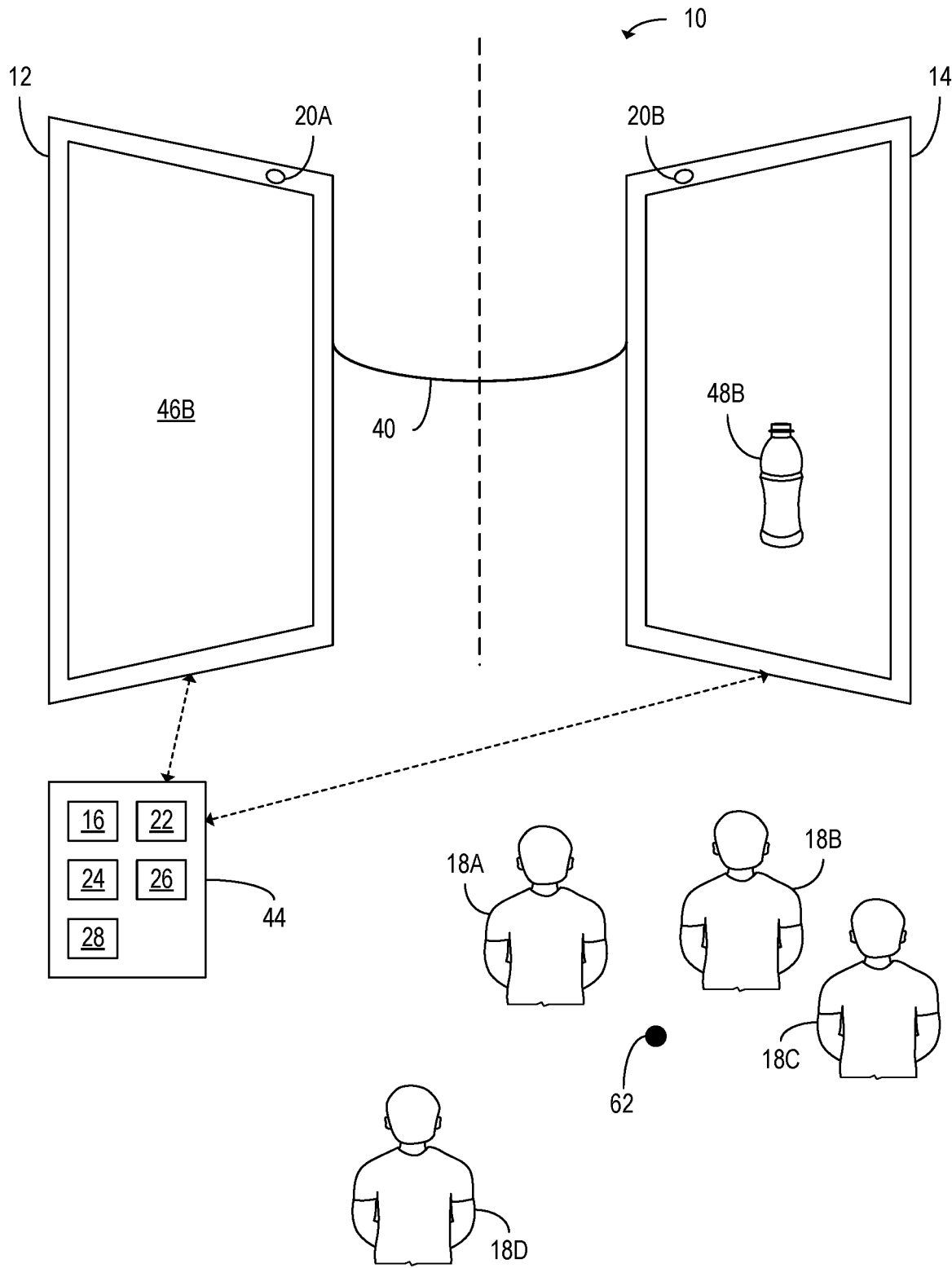

FIGS. 7A-B show an example embodiment in which the first display device 12 and the second display device 14 are each viewed by a plurality of users. In the example embodiment of FIGS. 7A-B, the plurality of users includes a first user 18A, a second user 18B, a third user 18C, and a fourth user 18D. Although four users are shown in FIGS. 7A-B, it is appreciated that the plurality of users may include any number of users. The one or more sensors 20A and 20B may be configured to detect a position of each user of the plurality of users. Based on state data 30, including a first positional state 32 and/or a second positional state 34, received from the one or more sensors 20A and 20B, the processor 26 may be configured to determine an aggregate position 62 of the plurality of users. The aggregate position 62 may, for example, be a mean or median position of the plurality of users. In some embodiments, the processor 26 may be further configured to determine an aggregate head orientation and/or gaze direction of the plurality of users. The first graphical content 46A and/or the second graphical content 48A may be generated based at least in part on the aggregate position 62.

As shown in FIG. 7A, the first user 18A, the second user 18B, and the third user 18C are moving to the right. However, the fourth user 18D is stationary. The processor 26 may be configured to receive state data 30 including a detection of movement 42 of the first user 18A, the second user 18B, and the third user 18C. The state data 30 may further indicate that the fourth user 18D is not moving. Based at least in part on the detection of movement 42, the processor 26 may be configured to relocate the aggregate position 62. FIG. 7B shows the computing system 10 after the processor 26 has relocated the aggregate position 62. Based on the relocated aggregate position, the processor 26 may be further configured to modify the first graphical content 46A and/or the second graphical content 48A. In FIG. 7B, the first modified graphical content 46B is displayed at the first display device 12 and the second modified graphical content 48B is displayed at the second display device 14. To follow the movement of the plurality of users, the processor 26 has moved a graphical content item from the first display device 12 to the second display device 14. Relocating the graphical content item in this way may allow the graphical content item to be kept in view of a greater number of users as the plurality of users move.

Figure 8A:
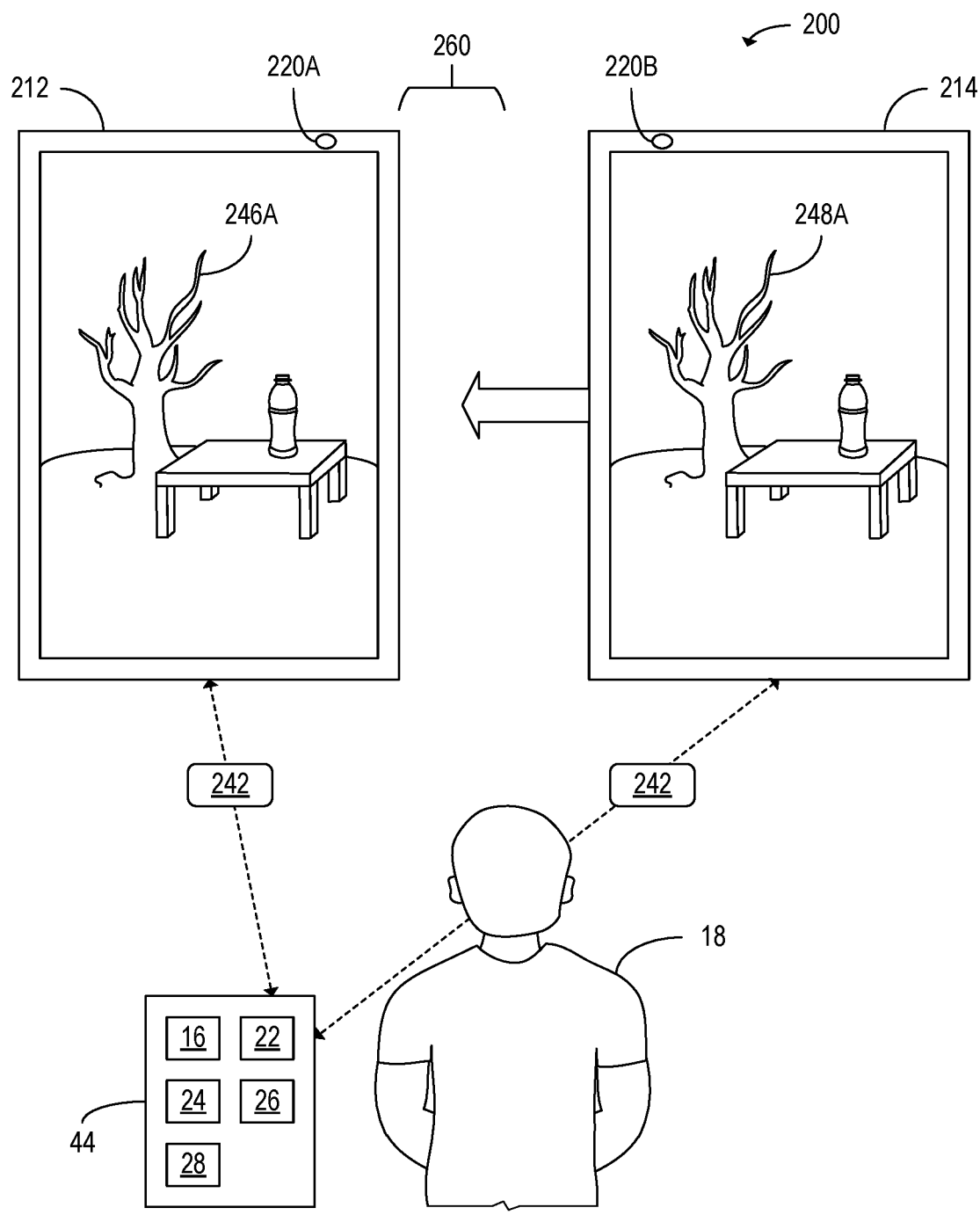
FIGS. 8A-8B show an example computing system configured to detect movement of a display device, according to one embodiment of the present disclosure.
Figure 8B:
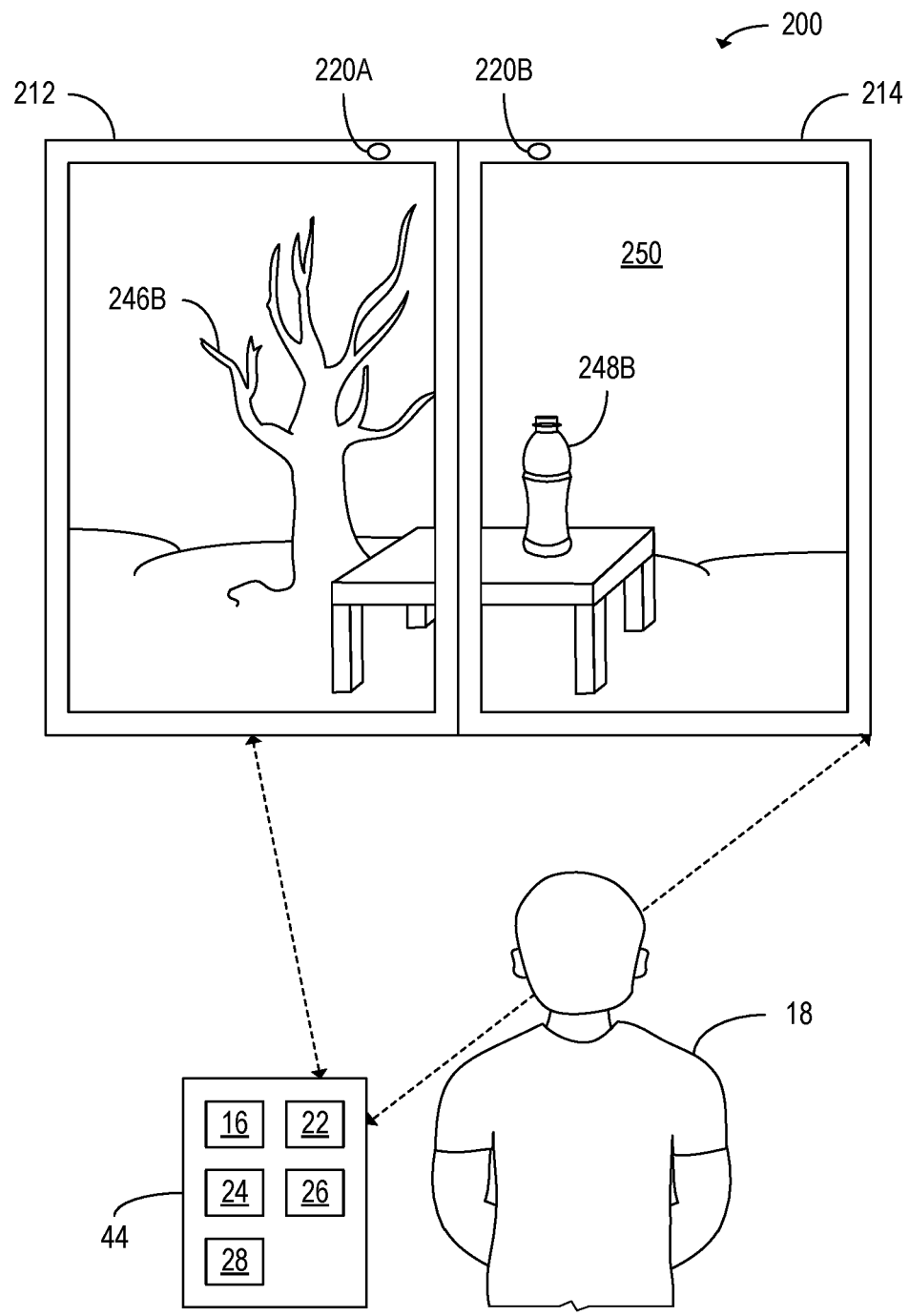

FIGS. 8A-B depict an example computing system 200 in which a first display device 212 and a second display device 214 may be combined so as to function as though they were a single display device. Before the first display device 212 and the second display device 214 are combined, as shown in FIG. 8A, the first display device 212 displays first graphical content 246A and the second display device 14 displays second graphical content 248A. In the example embodiment of FIG. 8A, the first graphical content 246A and the second graphical content 248A are the same. In other embodiments, the first display device 212 and the second display device 214 may display different graphical content.

In FIG. 8A, the first display device 212 and the second display device 214 include one or more sensors 220A and 220B respectively. The processor 26 may be further configured to receive a detection of movement 242 of the first display device 212, the second display device 214, and/or the at least one user 18 from the one or more sensors 220A and 220B. In FIG. 8A, the second display device 214 is moving to the left, toward the first display device 212. The processor 26 may be further configured to determine that the first display device 212 is within a threshold distance 260 of the second display device 214. When the processor 26 detects that the first display device 212 is within the threshold distance 260 of the second display device 214, the processor 26 may be further configured to generate combined-display graphical content 250 and transmit the combined-display graphical content 250 to the first display device 212 and the second display device 214. The computing system 200 of FIG. 8A is shown in FIG. 8B when the first display device 212 and the second display device 214 display the combined graphical content 250. As shown in FIG. 8B, a first portion 246B of the combined-display graphical content 250 may be displayed at the first display device 212 and a second portion 248B of the combined-display graphical content 250 may be displayed at the second display device 214.

Although FIGS. 8A-B show only a first display device 212 and a second display device 214, embodiments in which combined-display graphical content is displayed on three or more display devices are also contemplated. In such embodiments, the processor 26 may be further configured to determine, for each display device of a plurality of display devices, if that display device is within a threshold distance of another display device. A single threshold distance may be used for each display device. Alternatively, a plurality of threshold distances may be used, wherein each threshold distance of the plurality of threshold distances is associated with a display device or a pair of display devices.

Figure 9A:
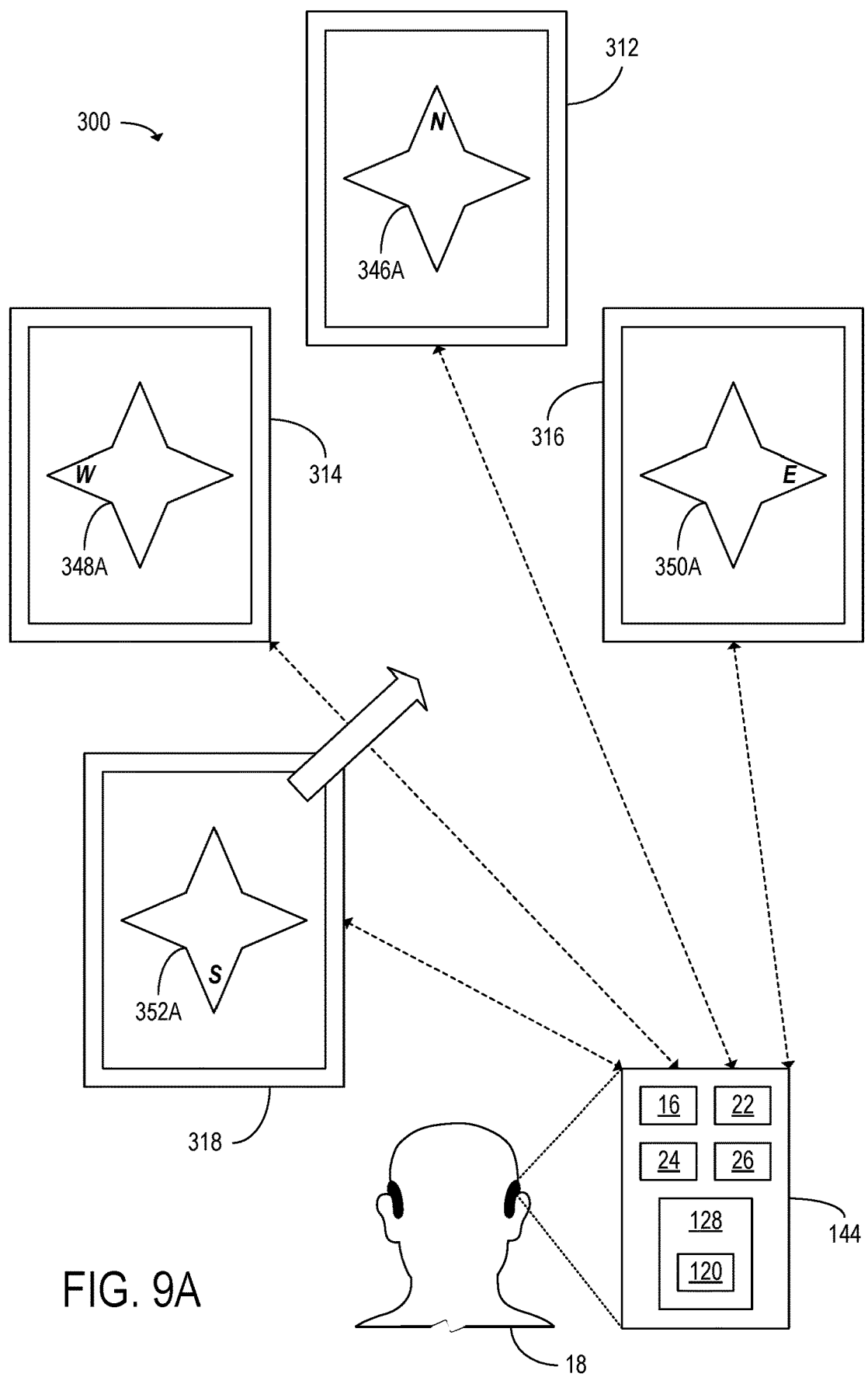
FIGS. 9A-9B show an example computing system configured to detect a predefined configuration of display devices, according to the embodiment of FIG. 1.
Figure 9B:
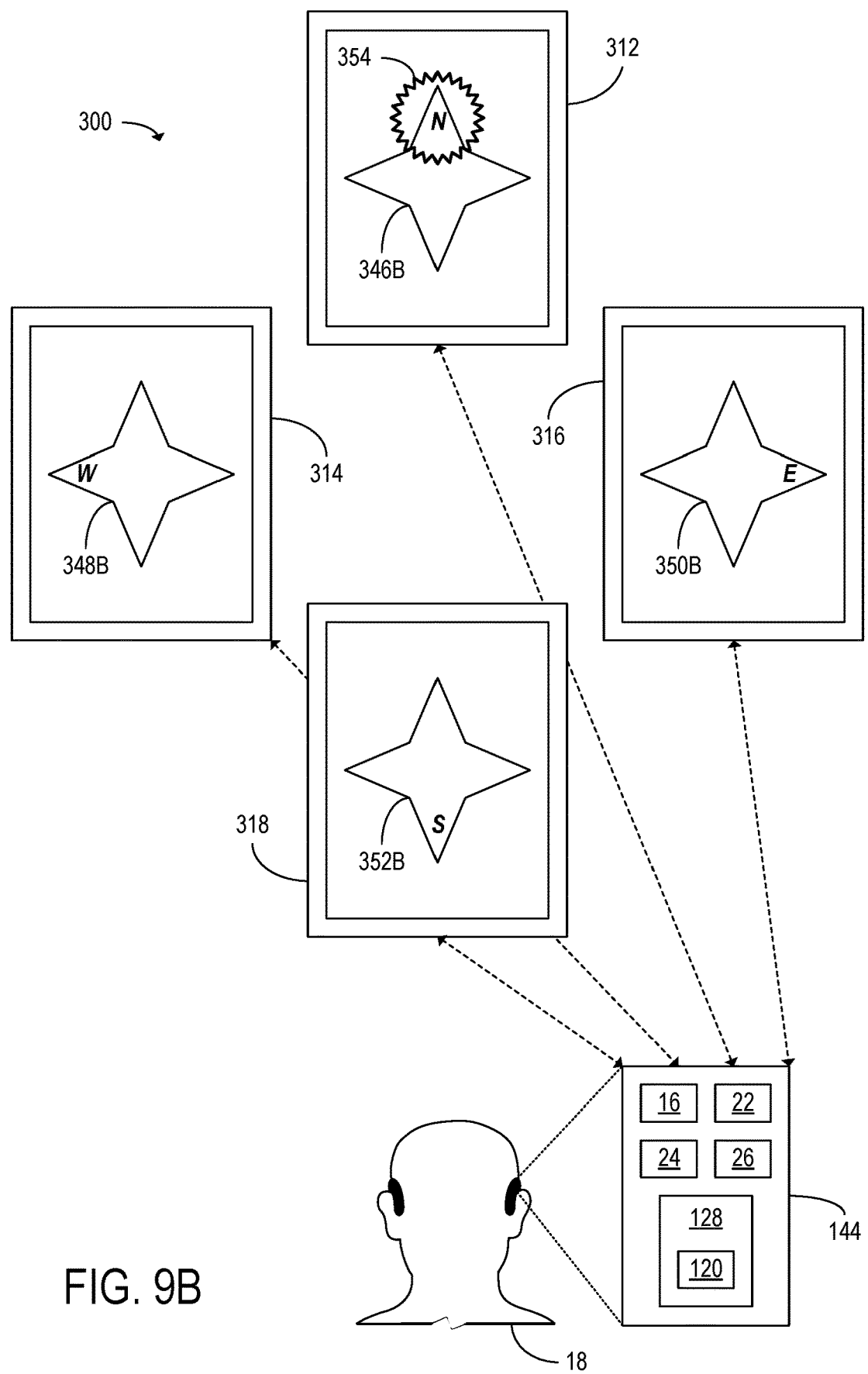

Another example embodiment is depicted in FIGS. 9A-B. In FIGS. 9A-B, a computing system 300 including a first display device 312, a second display device 314, a third display device 316, and a fourth display device 318 is shown. In the embodiment of FIGS. 9A-B, as in the embodiment of FIGS. 3A-B, the controller has the form of a head-mounted display device 144. The one or more sensors 120 included in the input device suite 128 of the head-mounted display device 144 may be configured to detect positional states of the first display device 312, the second display device 314, the third display device 316, and the fourth display device 318. The first display device 312, the second display device 314, the third display device 316, and the fourth display device 318 may be configured to display first graphical content 346A, second graphical content 348A, third graphical content 350A, and fourth graphical content 352A respectively. The graphical content displayed on each of the display devices may be based on the respective positional states of the display devices. In the example embodiment of FIGS. 9A-B, each of the display devices displays a compass rose, and each compass rose has a cardinal direction indicated based on the position of that display device relative to the other display devices and the user 18.

In FIG. 9A, the fourth display device 318 is shown moving to a new position. The computing system 300 after the fourth display device 318 has been moved is shown in FIG. 9B. Based on the positional states of the display devices, the processor 26 may be further configured to determine that the display devices and the at least one user 18 are arranged in a predefined pattern. In the example of FIGS. 9A-B, the predefined pattern is a pattern in which the display devices are arranged at points of a compass such that each display device corresponds to a cardinal direction. Subsequently to determining that the display devices are arranged in the predefined pattern, the processor 26 may be further configured to generate graphical content based on the determination. As shown in FIG. 9B, the graphical content generated based on the determination that the display devices are arranged in the predefined pattern is first modified graphical content 346B that is transmitted for display on the first display device 312. In the example of FIG. 9B, the first modified graphical content 346B includes a graphical content item 354 that serves as a direction indicator. The graphical content item 354 may, for example, indicate a direction toward an objective in a game.

Although FIGS. 9A-B show four display devices 312, 314, 316, and 318 and one user 18, the predefined pattern may include other numbers of display devices and/or users.

For example, when the computing system includes two display devices, the processor 26 may be further configured to determine that the first display device, the second display device, and the at least one user are arranged in a predefined pattern. The processor 26 may then generate the first graphical content and/or the second graphical content based on the determination.

Figure 10:
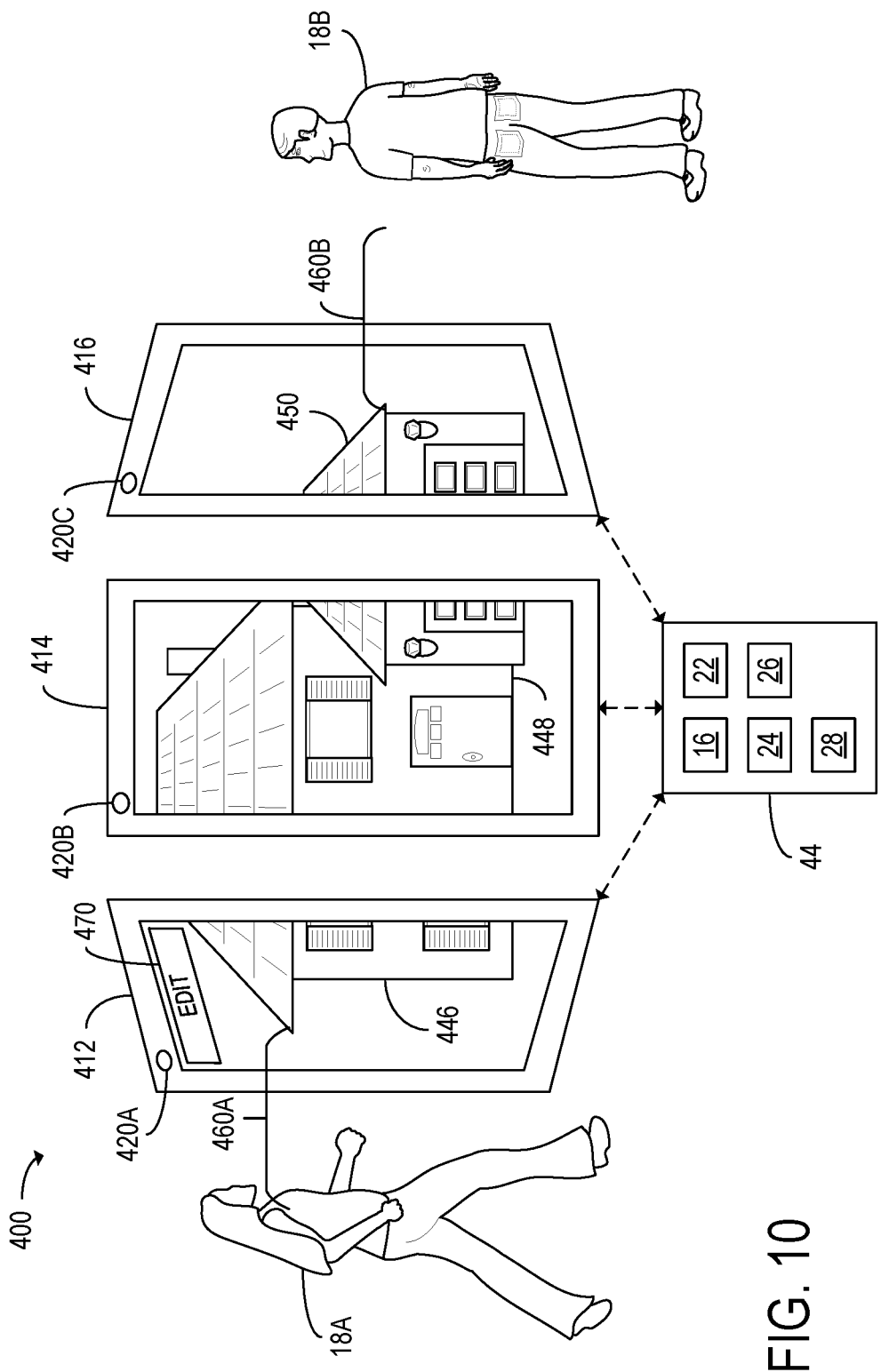
FIG. 10 shows an example computing system configured to enable and/or disable editing of graphical content based on a positional state of at least one user, according to one embodiment of the present disclosure.

Another example embodiment is shown in FIG. 10. The computing system 400 shown in FIG. 10 includes a first display device 412, a second display device 414, and a third display device 416, which are viewed by a first user 18A and a second user 18B. In addition, the three display devices respectively include at least a first sensor 420A, a second sensor 420B, and a third sensor 420C that may be configured to detect positional states of the display devices and the users. First graphical content 446, second graphical content 448, and third graphical content 450 are displayed on the first display device 412, the second display device 414, and the third display device 416 respectively. In the embodiment of FIG. 10, the first graphical content 446, second graphical content 448, and third graphical content 450 include a three-dimensional virtual object (a house), which may be displayed based on one or more of the positional states detected by the sensors.

The processor 26 may be further configured to enable or disable editing of graphical content based at least in part on the positional state of the display device on which that graphical content is displayed. The processor 26 may, for example, determine that the first user 18A is within a first threshold distance 460A of the nearest display device, in this case the first display device 412. The processor 26 may then generate first graphical content 446 that includes an editing icon 470. The processor 26 may then transmit the first graphical content 446 for display on the first display device 412.

In some embodiments, the first display device 412 may be a touch-sensitive display device, and the editing icon 470 may be an interactable icon. In such embodiments, the processor 26 may be further configured to perform an editing function in response to receiving a detection of interaction with the editing icon 470. The editing function may include modifying the first graphical content 446, the second graphical content 448, and/or the third graphical content 450.

In contrast, the processor 26 may determine that the second user 18B is outside a second threshold distance 460B from the nearest display device, in this case the third display device 416. The second threshold distance 460B may be equal to the first threshold distance 460A or may alternatively have some other value. Based on this determination, the processor 26 may not display the editing icon 470 on the third display device 416. Disabling editing in this way may, for example, allow for the third graphical content 450 to be less cluttered when the second user 18B is too far away from the third display device 416 to interact with a touch-sensitive interactable icon.

Although, in FIG. 10, the processor 26 determines whether to enable or disable editing of graphical content based on the distance between a display device and at least one user, the processor 26 may instead determine whether to enable or disable editing based on other criteria included in the positional states. For example, the processor 26 may enable editing when the head orientation and/or gaze direction of at least one user is within a predetermined range of angles and may disable editing when the head orientation and/or gaze direction is outside that range. Additionally or alternatively, the processor 26 may be configured to enable or disable editing based at least in part on an aggregate position 62 of a plurality of users. In the example of FIG. 10, the processor 26 may determine that neither the first user 18A nor the second user 18B is looking at the second display device 414 and may therefore disable editing at the second display device 414.

Figure 11:
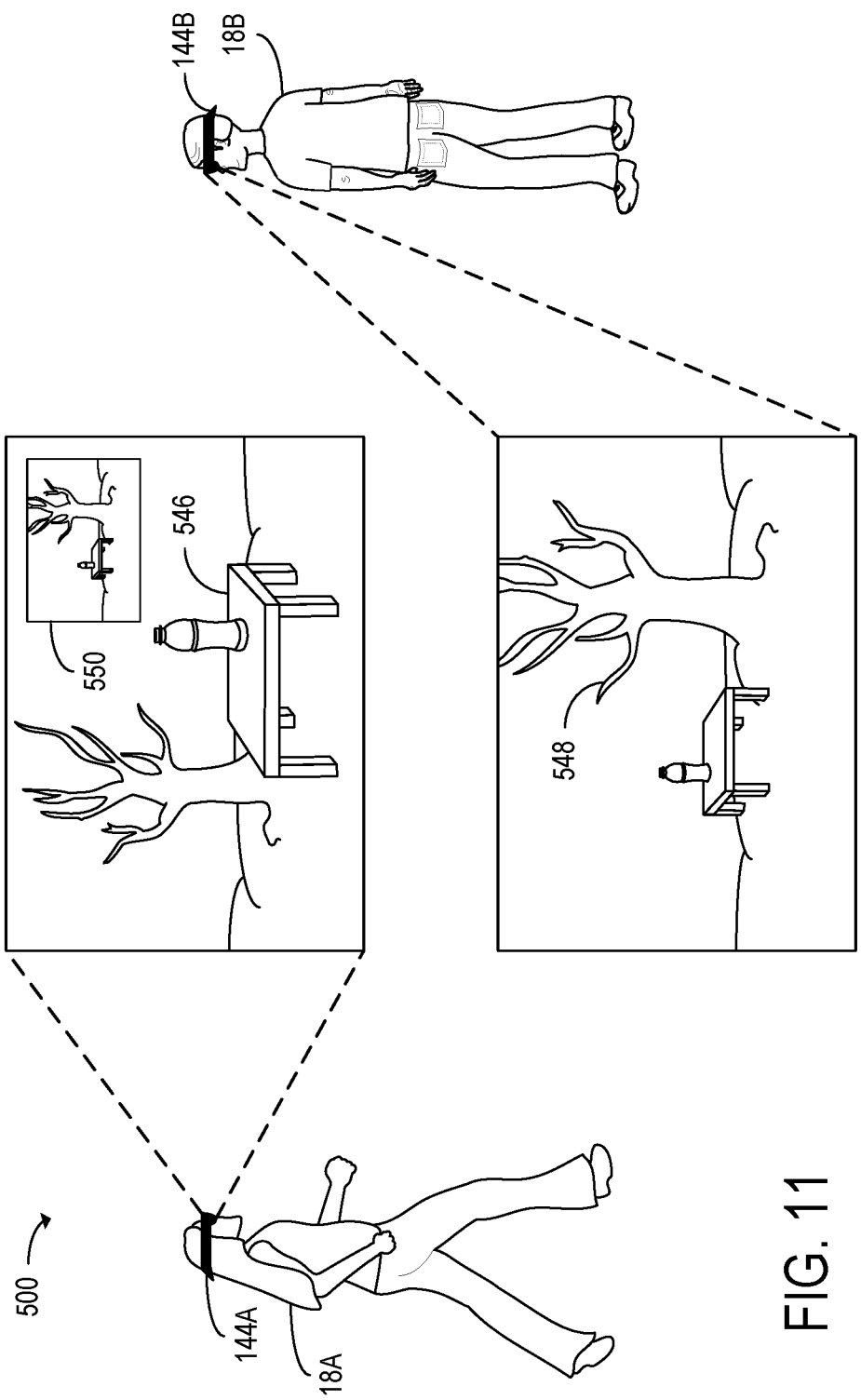
FIG. 11 shows an example computing system including a first head-mounted display device and a second head-mounted display device, according to one embodiment of the present disclosure.

An example computing system 500 according to another example embodiment is shown in FIG. 11. As shown in FIG. 11, the computing system 500 includes a first head-mounted display device 144A worn by a first user 18A and a second head-mounted display device 144B worn by a second user 18B. Each of the first head-mounted display device 144A and the second head-mounted display device 144B may include the components shown in FIGS. 3A-B.

The first head-mounted display device 144A may be configured to display first graphical content 546, and the second head-mounted display device 144B may be configured to display second graphical content 548. The first graphical content 546 and/or the second graphical content 548 may be generated by a processor 26 of the first head-mounted display device 144A, the second head-mounted display device 144B, and/or one or more offboard computing devices communicatively coupled to the first head-mounted display device 144A and/or the second head-mounted display device 144B. The processor 26 may be configured to generate the first graphical content 546 and/or the second graphical content 548 based at least in part on a first positional state 32 of the first head-mounted display device 144A and/or a second positional state 34 of the second head-mounted display device 144B. The first positional state 32 may include a first spatial position 36 of the first head-mounted display device 144A relative to at least the second head-mounted display device 144B and/or the second user 18B. The first positional state 32 may further include an angular orientation 40 of the first head-mounted display device 144A relative to the second head-mounted display device 144B and/or the second user 18B, and/or a detection of movement 42 of at least one of the first head-mounted display device 144A, the second head-mounted display device 144B, the first user 18A, and/or the second user 18B. The second positional state 34 may include corresponding state data of the second head-mounted display device 144B.

The first head-mounted display device 144A may receive the second graphical content 548 from the second head-mounted display device 144B, and the second head-mounted display device 144B may receive the first graphical content 546 from the first head-mounted display device 144A. The processors 26 of each of the head-mounted display devices may generate their respective graphical content based at least in part on the graphical content received from the other head-mounted display device. In the example of FIG. 11, the first graphical content 546 includes a picture-in-picture view 550 of the second graphical content 548.

A flowchart of a method 600 for displaying graphical content is shown in FIG. 12A. The method 600 may be performed at a computing system such as the computing system 10 of FIG. 1, the computing system 100 of FIG. 3A, the computing system 200 of FIGS. 8A-B, the computing system 300 of FIGS. 9A-B, the computing system 400 of FIG. 10, or the computing system 500 of FIG. 11. The method 600 may include steps performed at one or more sensors and may further include steps performed at a processor. At step 602, the method 600 may include at one or more sensors, detecting a first positional state of a first display device relative to a second display device and at least one user. The first positional state may include an angular orientation of the first display device relative to the second display device and/or the at least one user.

Steps 604, 606, and 608 of the method 600 may be performed at a processor included in the computing system. At step 604, the method 600 may include receiving the first positional state from the one or more sensors. At step 604, the method 600 may include generating first graphical content based at least in part on the first positional state. Other types of output such as audio output may also be generated based at least in part on the first positional state. At step 606, the method 600 may further include transmitting the first graphical content for display at the first display device.

Figure 12B:
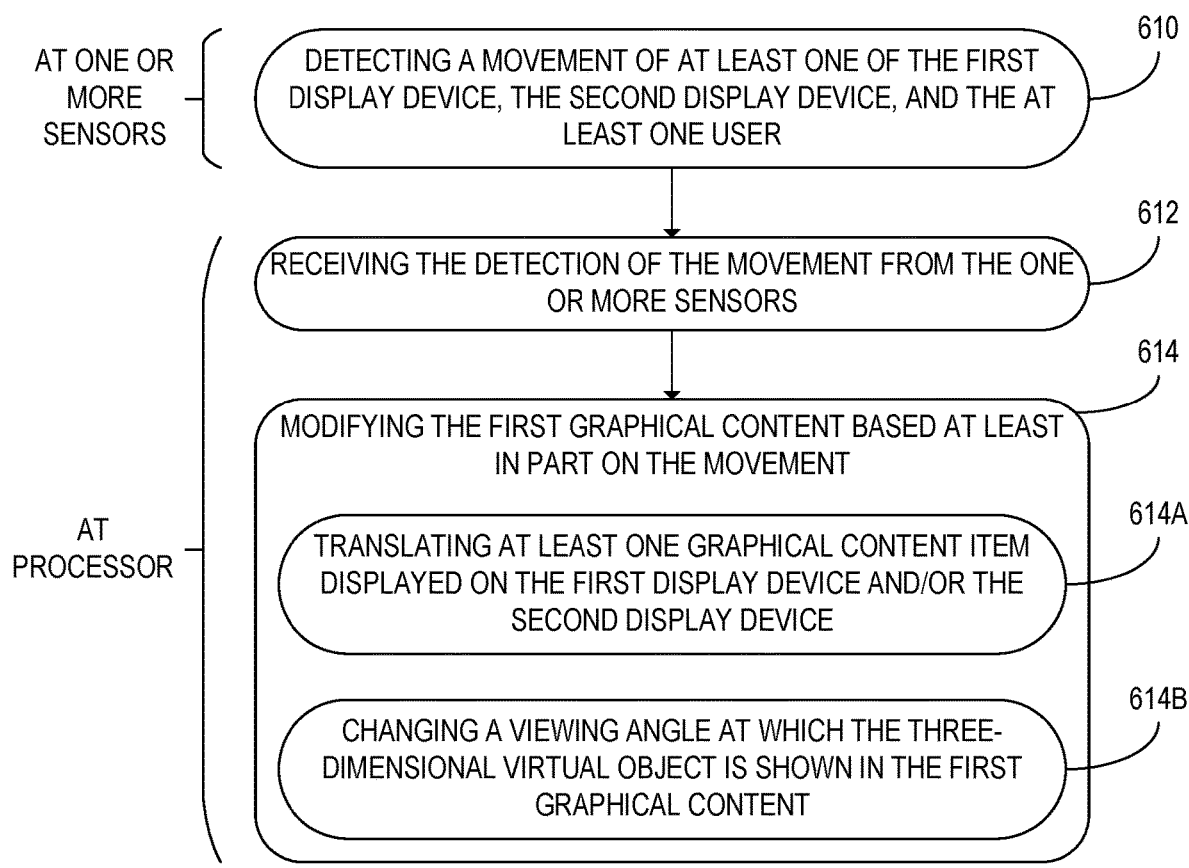
FIGS. 12B-12F show flowcharts of additional steps that may optionally be performed when performing the method of FIG. 12A.

FIG. 12B shows a flowchart of additional steps that may optionally be performed when performing the method 600. At step 610, the method 600 may further include, at the one or more sensors, detecting a movement of at least one of the first display device, the second display device, and the at least one user. In embodiments in which the computing system includes more than two display devices, the sensors may detect movement of the additional display devices beyond the first display device and the second display device. Steps 612 and 614 of the method 600 may be performed at the processor. At step 612, the method 600 may further include receiving the detection of the movement from the one or more sensors. The method 600 may further include, at step 614, modifying the first graphical content based at least in part on the movement. In some example embodiments, modifying the first graphical content may include, at step 614A, translating at least one graphical content item displayed on the first display device and/or the second display device. Additionally or alternatively, the first graphical content may include a three-dimensional virtual object, and modifying the first graphical content may include, at step 614B, changing a viewing angle at which the three-dimensional virtual object is shown in the first graphical content.

Figure 12C:
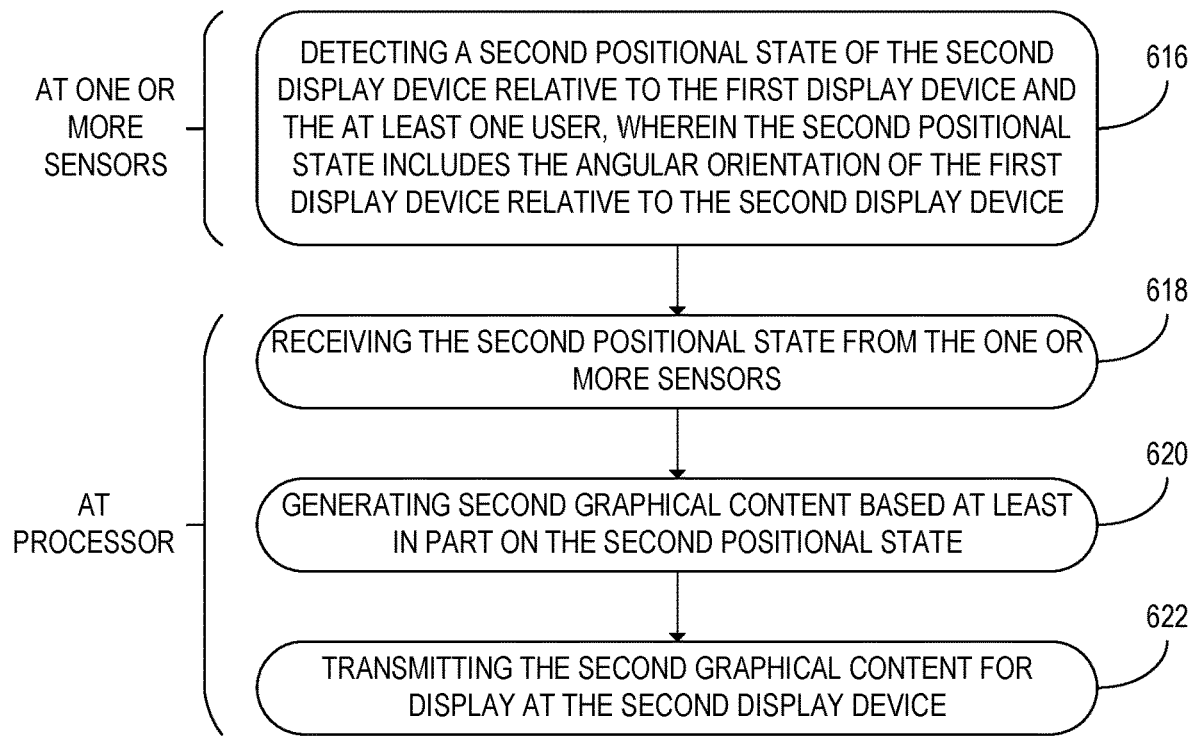

FIG. 12C shows a flowchart of other additional steps that may optionally be performed when performing the method 600. At step 616, the method 600 may include, at the one or more sensors, detecting a second positional state of the second display device relative to the first display device and the at least one user. The second positional state may include the angular orientation of the first display device relative to the second display device and/or the at least one user. Subsequent steps 618, 620, and 622 may be performed at the processor of the computing system. At step 618, the method 600 may further include receiving the second positional state from the one or more sensors. At step 620, the method 600 may further include generating second graphical content based at least in part on the second positional state. The second graphical content may also be generated based at least in part on the first positional state, and the first graphical content may also be generated based at least in part on the second positional state. At step 622, the method 600 may further include transmitting the second graphical content for display at the second display device.

Figure 12D:
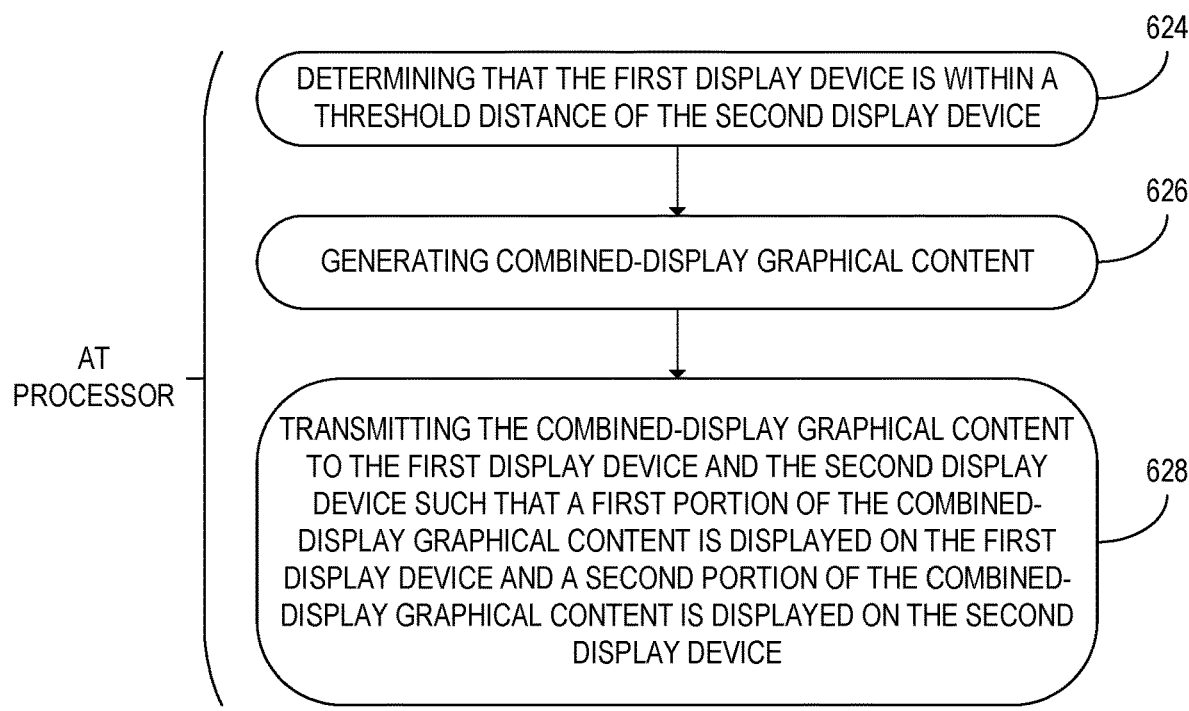

FIG. 12D shows a flowchart of other additional steps that may optionally be performed when performing the method 600. The steps shown in FIG. 12D may be performed at the processor. At step 624, the method 600 may further include determining that the first display device is within a threshold distance of the second display device. In response to this determination, the method 600 may further include, at step 626, generating combined-display graphical content. At step 628, the method 600 may further include transmitting the combined-display graphical content to the first display device and the second display device. The combined-display graphical content may be transmitted to the display devices such that a first portion of the combined-display graphical content is displayed at the first display device and a second portion of the combined-display graphical content is displayed at the second display device. Thus, the first display device and the second display device may be used as though they were a single display device when the first display device is within the threshold distance of the second display device. In some embodiments, the steps of FIG. 12D may also be performed based at least in part on the position of the at least one user.

Figure 12E:
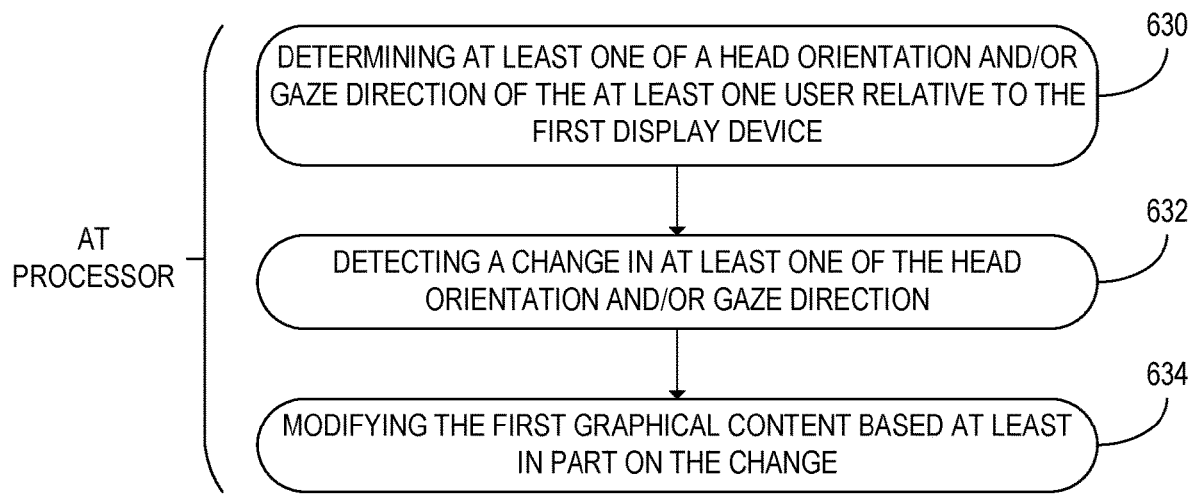

FIG. 12E shows a flowchart of other additional steps that may optionally be performed when performing the method 600. The steps shown in FIG. 12E may be performed at the processor. At step 630, the method 600 may further include determining at least one of a head orientation and/or gaze direction of the at least one user relative to the first display device. When the at least one user includes a plurality of users, step 630 may further include determining an aggregate head orientation and/or gaze direction of the plurality of users. At step 632, the method 600 may further include detecting a change in at least one of the head orientation and/or gaze direction. The method 600 may further include, at step 634, modifying the first graphical content based at least in part on the change. For example, modifying the first graphical content may include changing a viewing angle at which the three-dimensional virtual object is shown in the first graphical content.

Figure 12F:
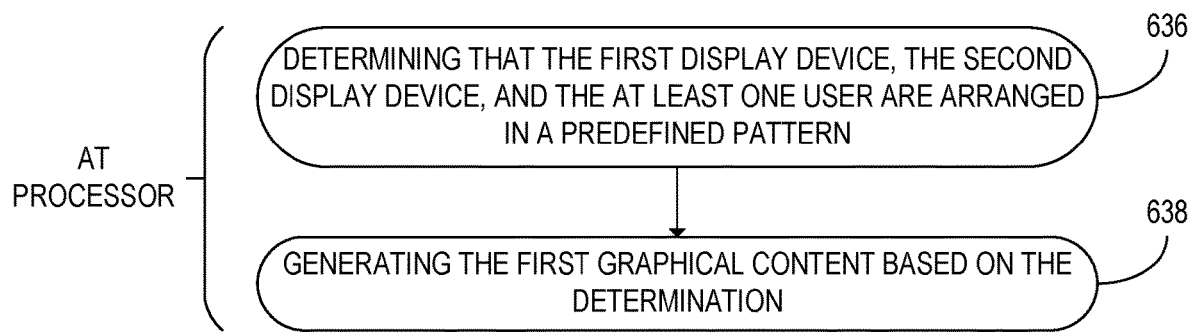

FIG. 12F shows a flowchart of other additional steps that may optionally be performed when performing the method 600. The steps shown in FIG. 12F may be performed at the processor. The method 600 may further include, at step 636, determining that the first display device, the second display device, and the at least one user are arranged in a predefined pattern. In some embodiments, the predefined pattern includes one or more additional display devices. The method 600 may further include, at step 638, generating the first graphical content based on the determination. Second graphical content and/or graphical content for display at the additional display devices may also be generated in some embodiments.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
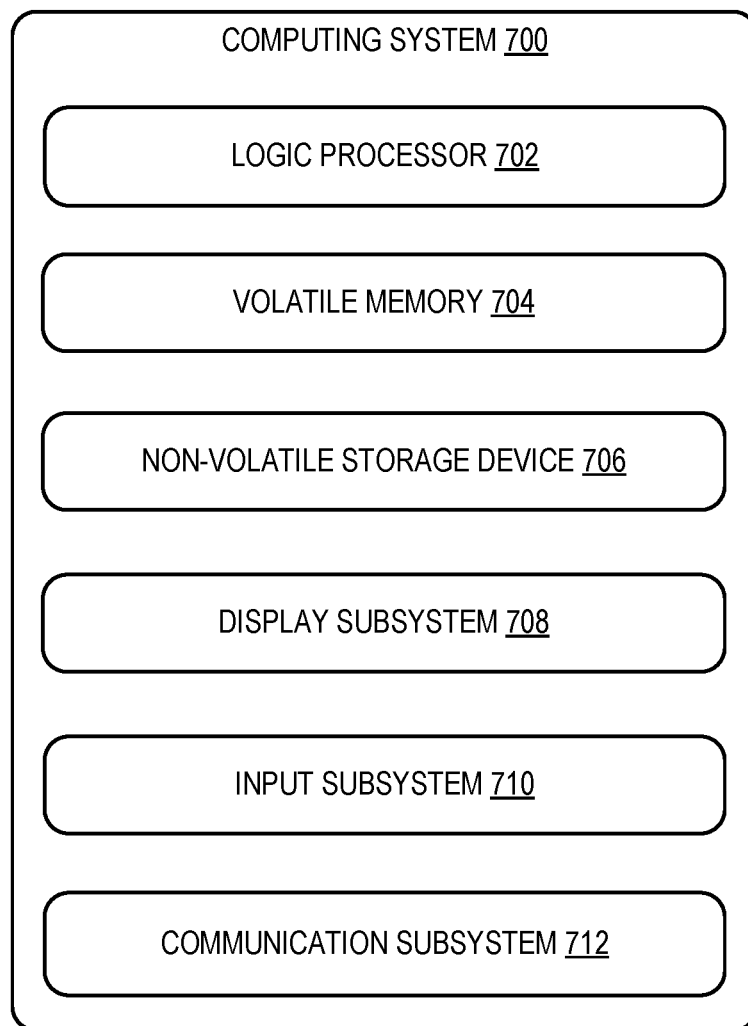
FIG. 13 shows a schematic representation of an example computing system, according to one embodiment of the present disclosure.

FIG. 13 schematically shows a non-limiting embodiment of a computing system 700 that can enact one or more of the methods and processes described above. Computing system 700 is shown in simplified form. Computing system 700 may, for example, embody the computing system 10 of FIG. 1 the computing system 100 of FIG. 3A, the computing system 200 of FIGS. 8A-B, the computing system 300 of FIGS. 9A-B, the computing system 400 of FIG. 10, or the computing system 500 of FIG. 11. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 700 includes a logic processor 702, volatile memory 704, and a non-volatile storage device 706. Computing system 700 may optionally include a display subsystem 708, input subsystem 710, communication subsystem 712, and/or other components not shown in FIG. 13.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 702 may include one or more physical processors (hardware) configured to execute software instructions. Additionally or alternatively, the logic processor 702 may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor 702 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 700 implemented to perform a particular function. In some cases, a program may be instantiated via logic processor 702 executing instructions held by non-volatile storage device 706, using portions of volatile memory 704. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 708 may be used to present a visual representation of data held by non-volatile storage device 706. As the herein described methods and processes change the data held by the non-volatile storage device 706, and thus transform the state of the non-volatile storage device 706, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem 710 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 712 may be configured to communicatively couple computing system 700 with one or more other computing devices. Communication subsystem 712 may include wired and/or wireless communication devices compatible with one or more different communication protocols. As non-limiting examples, the communication subsystem 712 may be configured for communication via a wireless telephone network, or a wired or wireless local- or wide-area network. In some embodiments, the communication subsystem 712 may allow computing system 700 to send and/or receive messages to and/or from other devices via a network such as the Internet.

According to one aspect of the present disclosure, a computing system is provided, comprising a plurality of display devices including at least a first display device and a second display device. The computing system may further comprise one or more sensors configured to detect a first positional state of the first display device relative to the second display device and at least one user. The first positional state may include an angular orientation of the first display device relative to the second display device. The computing system may further comprise a processor configured to receive the first positional state from the one or more sensors. The processor may be further configured to generate first graphical content based at least in part on the first positional state and transmit the first graphical content for display at the first display device.

According to this aspect, the one or more sensors may be further configured to detect a movement of at least one of the first display device, the second display device, and the at least one user. The processor may be further configured to receive the detection of the movement from the one or more sensors. The processor may be further configured to modify the first graphical content based at least in part on the movement.

According to this aspect, modifying the first graphical content may include translating at least one graphical content item displayed on the first display device and/or the second display device.

According to this aspect, the first graphical content may include a three-dimensional virtual object. Modifying the first graphical content may include changing a viewing angle at which the three-dimensional virtual object is shown in the first graphical content.

According to this aspect, the one or more sensors may be further configured to detect a second positional state of the second display device relative to the first display device and the at least one user. The second positional state may include the angular orientation of the first display device relative to the second display device. The processor may be further configured to receive the second positional state from the one or more sensors. The processor may be further configured to generate second graphical content based at least in part on the second positional state and transmit the second graphical content for display at the second display device.

According to this aspect, the processor may be further configured to determine that the first display device is within a threshold distance of the second display device. The processor may be further configured to generate combined-display graphical content. The processor may be further configured to transmit the combined-display graphical content to the first display device and the second display device such that a first portion of the combined-display graphical content is displayed at the first display device and a second portion of the combined-display graphical content is displayed at the second display device.

According to this aspect, the one or more sensors may include one or more of a depth camera, an RGB camera, an inertial measurement unit, and a wireless receiver.

According to this aspect, the processor may be further configured to determine at least one of a head orientation and/or gaze direction of the at least one user relative to the first display device.

According to this aspect, the processor may be further configured to detect a change in at least one of the head orientation and/or gaze direction. The processor may be further configured to modify the first graphical content based at least in part on the change.

According to this aspect, the one or more sensors may be configured to detect a position of each user of a plurality of users.

According to this aspect, the first graphical content may be generated based at least in part on an aggregate of the positions of each user of the plurality of users.

According to this aspect, the processor may be further configured to enable or disable editing of the first graphical content based at least in part on the first positional state.

According to this aspect, the processor may be further configured to determine that the first display device, the second display device, and the at least one user are arranged in a predefined pattern. The processor may be further configured to generate the first graphical content based on the determination.

According to another aspect of the present disclosure, a method for displaying graphical content is provided. The method may comprise, at one or more sensors, detecting a first positional state of a first display device relative to a second display device and at least one user. The first positional state may include an angular orientation of the first display device relative to the second display device. The method may further comprise, at a processor, receiving the first positional state from the one or more sensors, generating first graphical content based at least in part on the first positional state, and transmitting the first graphical content for display at the first display device.

According to this aspect, the method may further comprise, at the one or more sensors, detecting a movement of at least one of the first display device, the second display device, and the at least one user. The method may further comprise, at the processor, receiving the detection of the movement from the one or more sensors and modifying the first graphical content based at least in part on the movement.

According to this aspect, the method may further comprise, at the processor, determining that the first display device is within a threshold distance of the second display device. The method may further comprise generating combined-display graphical content. The method may further comprise transmitting the combined-display graphical content to the first display device and the second display device such that a first portion of the combined-display graphical content is displayed at the first display device and a second portion of the combined-display graphical content is displayed at the second display device.

According to this aspect, the method may further comprise, at the processor, determining at least one of a head orientation and/or gaze direction of the at least one user relative to the first display device.

According to this aspect, the method may further comprise, at the processor, detecting a change in at least one of the head orientation and/or gaze direction and modifying the first graphical content based at least in part on the change.

According to this aspect, the method may further comprise, at the processor, determining that the first display device, the second display device, and the at least one user are arranged in a predefined pattern. The method may further comprise generating the first graphical content based on the determination.

According to another aspect of the present disclosure, a computing system is provided, comprising a plurality of display devices including at least a first display device and a second display device. The computing system may further comprise one or more sensors configured to detect a first positional state of the first display device relative to the second display device and at least one user. The first positional state may include an angular orientation of the first display device relative to the second display device. The computing system may further comprise a processor configured to receive the first positional state from the one or more sensors, generate first graphical content, transmit the first graphical content for display at the first display device, and enable or disable editing of the first graphical content based at least in part on the first positional state.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
  a plurality of display devices including at least:
    a first display device; and
    a second display device;
  one or more sensors configured to detect a first positional state of the first display device relative to the second display device and a plurality of users, wherein:
    the first positional state includes an angular orientation of the first display device relative to the second display device; and
    the one or more sensors are configured to detect a position of each user of the plurality of users; and
  a processor configured to:
    receive the first positional state from the one or more sensors;
    generate first graphical content based at least in part on the first positional state and an aggregate of the positions of each user of the plurality of users;
    transmit the first graphical content for display at the first display device;
    detect a change in the aggregate of the positions; and
    relocate a graphical content item included in the first graphical content from the first display device to the second display device based on the change in the aggregate of the positions.

2. The computing system of claim 1, wherein:
  the one or more sensors are further configured to detect a movement of at least one of the first display device, the second display device, and at least one user of the plurality of users; and
  the processor is further configured to:
    receive the detection of the movement from the one or more sensors; and
    modify the first graphical content based at least in part on the movement.

3. The computing system of claim 2, wherein modifying the first graphical content includes translating at least one graphical content item displayed on the first display device and/or the second display device.

4. The computing system of claim 2, wherein the first graphical content includes a three-dimensional virtual object, and wherein modifying the first graphical content includes changing a viewing angle at which the three-dimensional virtual object is shown in the first graphical content.

5. The computing system of claim 1, wherein:
  the one or more sensors are further configured to detect a second positional state of the second display device relative to the first display device and at least one user of the plurality of users, wherein the second positional state includes the angular orientation of the first display device relative to the second display device; and
  the processor is further configured to:
    receive the second positional state from the one or more sensors;
    generate second graphical content based at least in part on the second positional state; and
    transmit the second graphical content for display at the second display device.

6. The computing system of claim 1, wherein the processor is further configured to:
  determine that the first display device is within a threshold distance of the second display device;
  generate combined-display graphical content; and
  transmit the combined-display graphical content to the first display device and the second display device such that a first portion of the combined-display graphical content is displayed at the first display device and a second portion of the combined-display graphical content is displayed at the second display device.

7. The computing system of claim 1, wherein the one or more sensors include one or more of a depth camera, an RGB camera, an inertial measurement unit, and a wireless receiver.

8. The computing system of claim 1, wherein the processor is further configured to determine at least one of a head orientation and/or gaze direction of at least one user of the plurality of users relative to the first display device.

9. The computing system of claim 8, wherein the processor is further configured to:
  detect a change in at least one of the head orientation and/or gaze direction; and
  modify the first graphical content based at least in part on the change.

10. The computing system of claim 1, wherein the processor is further configured to enable or disable editing of the first graphical content based at least in part on the first positional state.

11. The computing system of claim 1, wherein the processor is further configured to:
  determine that the first display device, the second display device, and at least one user of the plurality of users are arranged in a predefined pattern; and
  generate the first graphical content based on the determination.

12. A method for displaying graphical content, the method comprising:
  at one or more sensors, detecting a first positional state of a first display device relative to a second display device a plurality of users, wherein:
    the first positional state includes an angular orientation of the first display device relative to the second display device; and
    the one or more sensors are configured to detect a position of each user of the plurality of users; and
  at a processor:
    receiving the first positional state from the one or more sensors;
    generating first graphical content based at least in part on the first positional state and an aggregate of the positions of each user of the plurality of users;
    transmitting the first graphical content for display at the first display device;
    detect a change in the aggregate of the positions; and
    relocate a graphical content item included in the first graphical content from the first display device to the second display device based on the change in the aggregate of the positions.

13. The method of claim 12, further comprising:
  at the one or more sensors, detecting a movement of at least one of the first display device, the second display device, and at least one user of the plurality of users; and
  at the processor:

receiving the detection of the movement from the one or more sensors; and modifying the first graphical content based at least in part on the movement.

14. The method of claim 12, further comprising, at the processor:

determining that the first display device is within a threshold distance of the second display device;

generating combined-display graphical content; and transmitting the combined-display graphical content to the first display device and the second display device such that a first portion of the combined-display graphical content is displayed at the first display device and a second portion of the combined-display graphical content is displayed at the second display device.

15. The method of claim 12, further comprising, at the processor, determining at least one of a head orientation and/or gaze direction of at least one user of the plurality of users relative to the first display device.

16. The method of claim 15, further comprising, at the processor:

detecting a change in at least one of the head orientation and/or gaze direction; and modifying the first graphical content based at least in part on the change.

17. The method of claim 12, further comprising, at the processor:

determining that the first display device, the second display device, and at least one user of the plurality of users are arranged in a predefined pattern; and generating the first graphical content based on the determination.

18. A computing system comprising:

a plurality of display devices including at least:
 a first display device; and
 a second display device;

one or more sensors configured to detect a first positional state of the first display device relative to the second display device and at least one user, wherein the first positional state includes an angular orientation of the first display device relative to the second display device; and a processor configured to:

receive the first positional state from the one or more sensors;

generate first graphical content based at least in part on the first positional state;

transmit the first graphical content for display at the first display device; and enable or disable editing of the first graphical content based at least in part on the first positional state, wherein editing is disabled when the at least one user is determined to be outside a threshold distance of the first display device.

19. The computing system of claim 18, wherein the at least one user is one of a plurality of users;

wherein the one or more sensors are configured to detect a position of each user of the plurality of users; and wherein the processor is further configured to:

generate the first graphical content further based at least in part on the first positional state and an aggregate of the positions of each user of the plurality of users;

detect a change in the aggregate of the positions of each user of the plurality of users;

relocate a graphical content item included in the first graphical content from the first display device to the second display device based on the change in the aggregate of the positions; and enable or disable editing of the first graphical content further based at least in part on the aggregate of the positions.

* * * * *